United States Patent
Byun et al.

(10) Patent No.: US 6,651,890 B2
(45) Date of Patent: *Nov. 25, 2003

(54) COMBINATION HAND-HELD AND COUNTER-TOP OMNIDIRECTIONAL SCANNER

(76) Inventors: Sung Ho Byun, 1537 Chalet Dr., Cherry Hill, NJ (US) 08003; Mark C. Schmidt, 1659 Woodland Dr., Williamstown, NJ (US) 08094; Garrett K. Russell, 1137 Musket Rd., Newark, DE (US) 19713; Charles A. Naylor, 484 Center St., Sewell, NJ (US) 08080; Harry C. Knowles, 425 E. Linden St., Moorestown, NJ (US) 08057; Peter Bressler, 676 Kater St., Philadelphia, PA (US) 19147

( * ) Notice: Subject to any disclaimer, the term of this patent is extended or adjusted under 35 U.S.C. 154(b) by 58 days.

This patent is subject to a terminal disclaimer.

(21) Appl. No.: 09/900,005

(22) Filed: Jul. 6, 2001

(65) Prior Publication Data

US 2002/0030107 A1 Mar. 14, 2002

Related U.S. Application Data

(63) Continuation of application No. 09/323,292, filed on Jun. 1, 1999, now Pat. No. 6,257,492, which is a continuation-in-part of application No. 08/943,267, filed on Oct. 3, 1997, now Pat. No. 6,098,885, and a continuation-in-part of application No. 08/850,295, filed on May 5, 1997, now abandoned, and a continuation-in-part of application No. 08/827,118, filed on Mar. 27, 1997, now Pat. No. 5,925,870, and a continuation-in-part of application No. 08/645,335, filed on May 13, 1996, now Pat. No. 5,942,743, and a continuation-in-part of application No. 08/645,331, filed on May 13, 1996, now Pat. No. 5,844,227, said application No. 08/645,335, and application No. 08/645,331, each is a continuation-in-part of application No. 08/645,486, filed on May 13, 1996, now Pat. No. 5,796,091, which is a continuation-in-part of application No. 08/615,054, filed on Mar. 12, 1996, now Pat. No. 6,286,760, which is a continuation-in-part of application No. 08/584,135, filed on Jan. 11, 1996, now Pat. No. 5,616,908, and a continuation-in-part of application No. 08/573,949, filed on Dec. 18, 1995, now abandoned, and a continuation-in-part of application No. 08/561,479, filed on Nov. 20, 1995, now Pat. No. 5,661,292, and a continuation-in-part of application No. 08/278,109, filed on Nov. 24, 1993, now Pat. No. 5,484,992, and a continuation-in-part of application No. 08/489,305, filed on Jun. 9, 1995, now abandoned, and a continuation-in-part of application No. 08/476,069, filed on Jun. 7, 1995, now Pat. No. 5,591,953, and a continuation-in-part of application No. 08/365,193, filed on Dec. 28, 1994, now Pat. No. 5,557,093, and a continuation-in-part of application No. 08/293,493, filed on Aug. 19, 1994, now Pat. No. 5,525,789, and a continuation-in-part of application No. 08/292,237, filed on Aug. 17, 1994, now Pat. No. 5,808,285, said application No. 08/943,267, is a continuation of application No. 08/865,257, filed on May 29, 1997, now Pat. No. 6,460,767, which is a continuation of application No. 08/475,376, filed on Jun. 7, 1995, now Pat. No. 5,637,852, which is a continuation of application No. 08/365,193, which is a continuation of application No. 08/036,314, filed on Mar. 24, 1993, now abandoned, which is a continuation of application No. 07/580,738, filed on Sep. 10, 1990, now Pat. No. 5,216,232, said application No. 08/850,295, is a continuation of application No. 08/439,224, filed on May 11, 1995, now Pat. No. 5,627,359, said application No. 08/827,118, is a continuation of application No. 08/584,135.

(51) Int. Cl.⁷ .............................................. G06K 7/10
(52) U.S. Cl. ................................................ 235/462.43
(58) Field of Search ........................ 235/462.43, 462.01

(56) References Cited

U.S. PATENT DOCUMENTS

| | | | |
|---|---|---|---|
| 3,902,048 | A | 8/1975 | Fleischer et al. |
| 3,911,270 | A | 10/1975 | Traub |
| 3,919,527 | A | 11/1975 | Bowen et al. |
| 3,947,816 | A | 3/1976 | Rabedeau |
| 3,978,317 | A | 8/1976 | Yamaguchi et al. |
| 4,006,343 | A | 2/1977 | Izura et al. |
| 4,026,630 | A | 5/1977 | Wollenmann |
| 4,072,859 | A | 2/1978 | McWaters |
| 4,086,476 | A | 4/1978 | King |
| 4,093,865 | A | 6/1978 | Nickl |
| 4,097,729 | A | 6/1978 | Seligman et al. |
| 4,136,821 | A | 1/1979 | Sugiura et al. |
| 4,240,064 | A | 12/1980 | DevChoudhury |
| 4,387,297 | A | 6/1983 | Swartz et al. |

| | | | | | | |
|---|---|---|---|---|---|---|
| 4,409,470 A | 10/1983 | Shepard et al. | | 5,767,501 A | 6/1998 | Schmidt et al. |
| 4,431,912 A | 2/1984 | Dickson et al. | | 5,861,615 A | 1/1999 | Bridgelall et al. |
| 4,460,120 A | 7/1984 | Shepard et al. | | 6,053,413 A | 4/2000 | Swift et al. |
| 4,496,831 A | 1/1985 | Swartz et al. | | 6,085,974 A * | 7/2000 | Inoue .................. 235/380 |
| 4,521,678 A | 6/1985 | Winter | | | | |
| 4,553,081 A | 11/1985 | Koenck | | | | |
| 4,570,057 A | 2/1986 | Chadima et al. | | | | |
| 4,575,625 A | 3/1986 | Knowles | | | | |
| 4,603,262 A | 7/1986 | Eastman et al. | | | | |
| 4,639,070 A | 1/1987 | Ikeda et al. | | | | |
| 4,639,606 A | 1/1987 | Boles et al. | | | | |
| 4,647,143 A | 3/1987 | Yamazaki et al. | | | | |
| 4,652,732 A | 3/1987 | Nickl | | | | |
| 4,673,805 A | 6/1987 | Shepard et al. | | | | |
| 4,713,532 A | 12/1987 | Knowles | | | | |
| 4,736,095 A | 4/1988 | Shepard et al. | | | | |
| 4,737,702 A | 4/1988 | Koenck | | | | |
| 4,766,297 A | 8/1988 | McMillan | | | | |
| 4,766,298 A | 8/1988 | Meyers | | | | |
| 4,766,299 A | 8/1988 | Tierney et al. | | | | |
| 4,795,224 A | 1/1989 | Goto | | | | |
| 4,816,660 A | 3/1989 | Swartz et al. | | | | |
| 4,825,057 A | 4/1989 | Swartz et al. | | | | |
| 4,845,349 A | 7/1989 | Cherry | | | | |
| 4,861,973 A | 8/1989 | Hellekson et al. | | | | |
| 4,877,949 A | 10/1989 | Danielson et al. | | | | |
| 4,897,532 A | 1/1990 | Swartz et al. | | | | |
| 4,920,255 A | 4/1990 | Gabeler | | | | |
| 4,930,848 A | 6/1990 | Knowles | | | | |
| 4,933,538 A | 6/1990 | Heiman et al. | | | | |
| 4,939,356 A | 7/1990 | Rando et al. | | | | |
| 4,960,985 A | 10/1990 | Knowles | | | | |
| 4,962,980 A | 10/1990 | Knowles | | | | |
| 4,970,379 A | 11/1990 | Danstrom | | | | |
| 5,000,529 A | 3/1991 | Katoh et al. | | | | |
| 5,015,833 A | 5/1991 | Shepard et al. | | | | |
| 5,017,765 A | 5/1991 | Shepard et al. | | | | |
| 5,026,975 A | 6/1991 | Gruber et al. | | | | |
| 5,039,184 A | 8/1991 | Murakawa et al. | | | | |
| 5,059,777 A | 10/1991 | Wittensoldner et al. | | | | |
| 5,086,215 A | 2/1992 | Carsner et al. | | | | |
| 5,107,100 A | 4/1992 | Shepard et al. | | | | |
| 5,115,333 A | 5/1992 | Mergenthaler et al. | | | | |
| 5,124,537 A | 6/1992 | Chandler et al. | | | | |
| 5,124,539 A | 6/1992 | Krichever et al. | | | | |
| 5,132,523 A | 7/1992 | Bassett | | | | |
| 5,153,417 A | 10/1992 | Sekai et al. | | | | |
| 5,180,904 A | 1/1993 | Shepard et al. | | | | |
| 5,196,696 A | 3/1993 | Lindacher | | | | |
| 5,198,650 A | 3/1993 | Wike | | | | |
| 5,212,370 A | 5/1993 | Wittensoldner et al. | | | | |
| 5,216,231 A | 6/1993 | Ouchi | | | | |
| 5,221,832 A | 6/1993 | Collins et al. | | | | |
| 5,250,790 A | 10/1993 | Melistsky et al. | | | | |
| 5,262,627 A | 11/1993 | Shepard | | | | |
| 5,280,162 A | 1/1994 | Marwin | | | | |
| 5,324,924 A | 6/1994 | Cai | | | | |
| 5,420,411 A | 5/1995 | Salatto et al. | | | | |
| 5,479,002 A | 12/1995 | Heiman et al. | | | | |

FOREIGN PATENT DOCUMENTS

EP          0 520 632 A2    12/1992

OTHER PUBLICATIONS

"Hologram Scanner for Pos Bar Code Symbol Reader" by Hiroyuki Ikeda et al., published in Fujitsu Scientific & Technical Journal, vol. 15, No. 4, pp. 59–76.

Product Brochure for Spectra–Physics Freedom™ Scanner, by Spectra Physics, Inc. (2 pages).

Product Brochure for Omniscan 1990 OS–510 by Micro Video, Inc. (4.

NCR Technology Marketing Circa 1988 Division Product Release for NCR 7852 Scanner, published by NCR Corporation.

Product Brochure entitled 1985 "Metrologic Bar Code Scanning Systems", by Metrologic Instruments Inc.

"Hand–held Holographic Scanner 1984 Having Highly Visible Locator Beam" by R.T. Cato, published in IBM Technical Disclosure Bulletin vol. 27, No. 4A.

* cited by examiner

Primary Examiner—Michael G. Lee
Assistant Examiner—Lisa M. Caputo
(74) Attorney, Agent, or Firm—Law Offices of Royal W. Craig

(57) ABSTRACT

A bar code scanner for either fixed or hand-held disposition at a counter. The scanner includes a compact housing including a spherical head with a window and a downwardly protruding stem, and a sliding carriage attached to the base of the stem. The stem and sliding carriage cooperate with arcuate guide rails in the compact base for positioning the window via pivoting the head about a horizontal axis. An omni-directional scanning assembly is mounted in the head and this includes an object detection circuit for detecting and determining the presence of an object within an operative scanning field, a light source for generating a laser beam when an object is within the scanning field, a scanning mechanism for scanning the light beam across the object and its bar code, a photoreceiving circuit for receiving light reflected from the bar code, an A/D converter for generating a digital signal representing the light reflected from the bar code, and processing and control circuitry for decoding the bar coded-information and controlling overall system flow.

27 Claims, 18 Drawing Sheets

COMBINATION HAND-HELD AND COUNTER-TOP OMNIDIRECTIONAL SCANNER

CROSS-REFERENCE TO RELATED APPLICATIONS

The present application is a continuation of U.S. application Ser. No. 09/323,292 filed Jun. 1, 1999 (now U.S. Pat. No. 6,257,492), which is a continuation-in-part of application Ser. No. 08/645,335 filed May 13, 1996 (now U.S. Pat. No. 5,942,743), and Ser. No. 08/645,331 filed May 13, 1996 (now U.S. Pat. No. 5,844,227), and Ser. No. 08/943,267, filed Oct. 3, 1997 now U.S. Pat. No. 6,098,885, and Ser. No. 08/850,295 filed May 5, 1997 now abandoned, and Ser. No. 08/827,118, filed Mar. 27, 1997, now U.S. Pat. No. 5,925,870.

Both of the Ser. Nos. 08/645,335 and 08/645,331 applications are continuations-in-part of application Ser. No. 08/645,486 filed May 13, 1996 (now U.S. Pat. No. 5,796,091), which is a continuation-in-part of Ser. No. 08/615,054 filed Mar. 12, 1996 (now U.S. Pat. No. 6,286,760), which is a continuation-in-part of application Ser. No. 08/292,237 filed Aug. 17, 1994 (now U.S. Pat. No. 5,808,285); application Ser. No. 08/365,193 filed Dec. 28, 1994 (now U.S. Pat. No. 5,557,093); application Ser. No. 08/293,493 filed Aug. 19, 1994 (now U.S. Pat. No. 5,525,789); application Ser. No. 08/573,949 filed Dec. 18, 1995 (now abandoned); application Ser. No. 08/561,479 filed Nov. 20, 1995 (now U.S. Pat. No. 5,661,292); application Ser. No. 08/278,109 filed Nov. 24, 1993 (now U.S. Pat. No. 5,484,992); application Ser. No. 08/489,305 filed Jun. 9, 1995 (now abandoned); application Ser. No. 08/476,069 filed Jun. 7, 1995 (now U.S. Pat. No. 5,591,953); and application Ser. No. 08/584,135 filed Jan. 11, 1996 (now U.S. Pat. No. 5,616,908).

Ser. No. 08/943,267 is a continuation of application Ser. No. 08/865,257 filed May 29, 1997 now U.S. Pat. No. 6,460,767, which is a continuation of application Ser. No. 08/475,376 filed Jun. 7, 1995 (now U.S. Pat. No. 5,637,852), which is a continuation of application Ser. No. 08/365,193 filed Dec. 28, 1994 (now U.S. Pat. No. 5,557,093), which is a continuation of application Ser. No. 08/036,314 filed Mar. 24, 1993 (now abandoned), which is a continuation of application Ser. No. 07/580,738 filed Sep. 10, 1990 (now U.S. Pat. No. 5,216,232).

Ser. No. 08/850,295 is a continuation of application Ser. No. 08/439,224, filed May 11, 1995 (now U.S. Pat. No. 5,627,359).

Ser. No. 08/827,118 is a continuation of application Ser. No. 08/584,135, filed Jan. 11, 1996 (now U.S. Pat. No. 5,616,908).

All of the aforesaid applications are commonly owned by Metrologic Instruments, Inc., of Blackwood, N.J.

BACKGROUND OF THE INVENTION

1. Field of the Invention

The present invention relates to bar code scanners and, more particularly, to an improved ergonomic bar code scanning system having a compact housing for either fixed or hand-held disposition at a counter.

2. Description of the Background

Many commercial scanning systems are available for scanning bar codes, e.g., the UPC or EAN bar codes, which are imprinted on products or packaging.

One type of scanning system is generally referred to an omnidirectional scanner. Often these devices can be found mounted in a checkout counter of a supermarket or other retail point-of-sale environment. These scanning systems include a scanning window or aperture at the front of the scanner housing through which a scanning pattern is projected. The scanning pattern is created by a light source, typically a laser, and associated optical components that may produce a pattern of multi-directional scan lines. When an item bearing a bar code is brought into the field of the scan pattern so that at least one of the scan lines completely traverses the bar code, light is reflected off of the bar code and is received back through the window. The reflected light is detected by a photodetector or other light detection means. The signal from the photodetector is then processed by conventional means and forwarded to a microprocessor or other device which decodes the bar-coded information.

In-counter and presentation type scanners use a variety of optical configurations including mirrors, prisms and the like to fold the laser beam and create complex omnidirectional scanning patterns in order to insure that the bar code is scanned completely by at least one scan line so that it can be read accurately irrespective of its orientation within the scan pattern. Examples of such omnidirectional scanning patterns include: comb patterns, orthogonal patterns, interlaced patterns, star-like patterns, lissajous patterns and the like. While such prior art scanners may be suitable for their purpose, their physical configuration of the optical components necessary to produce such complex omnidirectional scanning patterns has resulted in scanner housings which are quite large in size and necessarily fixed.

Additionally the scanning window or aperture generally faces in a single direction. To change the direction of the scanning window and thus the direction of the scanning pattern, it was necessary to move the entire housing. In many applications, this is inconvenient, especially where there is limited counter space.

There have been various approaches to the problem. For example, U.S. Pat. No. 4,713,532 discloses a counter or slot scanner producing an aggressive scanning pattern having three rastered groups of intersecting scans that form a large "sweetspot" to enable the bar code to be read omnidirectionally. The '532 scanner has a compact housing with a relatively small "footprint" which can be mounted on or in a counter. Depending upon the orientation of the scan, its window may be horizontal, vertical, or at some other orientation. Devices embodying the teachings of that patent have been sold by the assignee of that patent (and of this application), Metrologic Instruments, Inc., under the designation MS260. However, once the scanner housing was positioned at a particular orientation, it was fixed and could not be easily moved.

In U.S. Pat. No. 5,216,231, to Knowles et al., an omnidirectional presentation scanner is disclosed. This scanner was designed to be mounted above the counter on an adjustable base. The base is constructed to allow the scanner housing to be adjusted in multiple directions so that the scanning pattern is projected in and desired orientation with respect to the counter. However, the base must be permanently secured to the countertop, which prevents the scanner from being lifted by hand to scan large or bulky items which do not fit on the countertop.

U.S. Pat. No. 5,767,501 to Schmidt et al. discloses a hand-held automatic portable bar code symbol scanner with an omnidirectional laser scanning platform mounted in the head of a hand-supportable housing. The hand-supportable housing can also be supported in separate base unit for hands-free omnidirectional presentation type scanning. The base unit is designed to be attached to a counter and is equipped with a pivoting receptacle, which allows the scanning window and therefore the projected scanning pattern to be adjustable about a horizontal axis. While this unit adds great flexibility and makes efficient use of counter space, it requires the user to return the hand-supportable housing to the base unit after each scan requiring alignment of the handle and handle receiving portions. Additionally, while the hand-supportable housing itself is compact, the combination of the hand-supportable housing with the base unit can be bulky and cumbersome in the valuable counterspace of the typical point-of-sale environment.

U.S. Pat. No. 5,479,002 to Heiman et al. discloses another partial solution in the form of a scan head that is adjustably mounted in a ball-and-socket joint on a scan module or housing. The scan head is movable about three mutually orthogonal axes, thereby allowing the operator to steer the light beam emitted from the head. However, the '002 patent does not disclose or suggest how the scan head and lower housing can be combined in a package that is conveniently hand-held as well as free-standing. Moreover, the design of the '002 housing as disclosed provides only for a single-line scan pattern and would not easily lend itself to the production of an omnidirectional scanning pattern.

Other attempts to produce compact omnidirectional scanners having adjustable housings or bases include the Symbol Technologies, Inc. Model LS 9100 and the PSC Model Duet omnidirectional scanners. Both units require removal of the hand-held scanner housing from the associated stand for hand-supported scanning.

Consequently, a need remains for a compact scanner configuration incorporating an integral base with an omnidirectional scanning head that is easily adjustable about at least one axis with respect to the base. The scanner being capable of aggressive omnidirectional scanning from both a hands-free standing position on a countertop or hand-supported by a user for scanning lager, bulky items with out requiring the user to remove and/or replace the scanner in its stand.

SUMMARY OF THE INVENTION

It is, therefore, an object of the present invention to provide an omnidirectional scanner of compact size, configured with an integrated base and scanning head, wherein the scanning head is easily adjustable with respect to the base, the entire unit being capable of economical manufacture.

It is another object to provide a scanner as described above in which the scanner head is rotationally attached to the base by a dual track sliding support mechanism that results in an rugged and durable integral scanning unit, whereby the head unit pivots easily with little or no friction against the base unit.

It is still another object to provide a bar code scanning system having an improved ergonomic compact housing for hand-held use in which the scanner housing has contoured lateral recesses on opposing sides to fit the hand of the user by providing thumb and finger grips.

It is another object to provide for a scanner having an improved design in which the scanner base provides a secure foundation for the pivoting the scanning head, and yet very little counter space is needed.

It is still another object to incorporate an aggressive and reliable omnidirectional scan platform in a housing as described above, the resulting system being capable of an aggressive omnidirectional scan from a free-standing fixed position on a countertop or while handheld by a user.

According to the present invention, the above-described and other objects are accomplished by providing a compact scanner including an improved ergonomic scanner housing. The scanner housing is formed of two parts, a base unit and a scanning head. The base unit has an upwardly directed curved opening and a pair of opposing arcuate guide rails attached to the inner wall of the base unit below the opening. Mounted to the base unit is the scanning head housing an omnidirectional scanning platform. The scanning head has an exterior curvature conforming to the curved opening of the base unit for rotational seating thereon. A neck portion protrudes from the bottom of the scanning head. The neck portion extends into the opening in the base unit for sliding engagement with the opposing guide rails. In this manner, the scanning head is supported within the opening of said base unit by the guide rails. The guide rails also permit the scanning head to pivot about a horizontal axis while supporting the head to minimize friction.

An omnidirectional scanning platform is housed in the scanning head. The scanning platform includes a light source for generating a light beam, a scanning mechanism and associated optics for producing an omnidirectional scanning for projection through a scanning window for scanning a bar code on abject presented to the scanning pattern, a light collector for a collecting light returned from the bar code, a photodiode for receiving light reflected from said bar code, an A/D conversion circuit for processing the signal produced by the photodiode, a microprocessor for decoding bar-coded information from the reflected light, and a control system for controlling the function of the above components.

The resulting scanning system permits an aggressive omnidirectional scan from a freestanding fixed position atop a counter or while handheld by a user.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
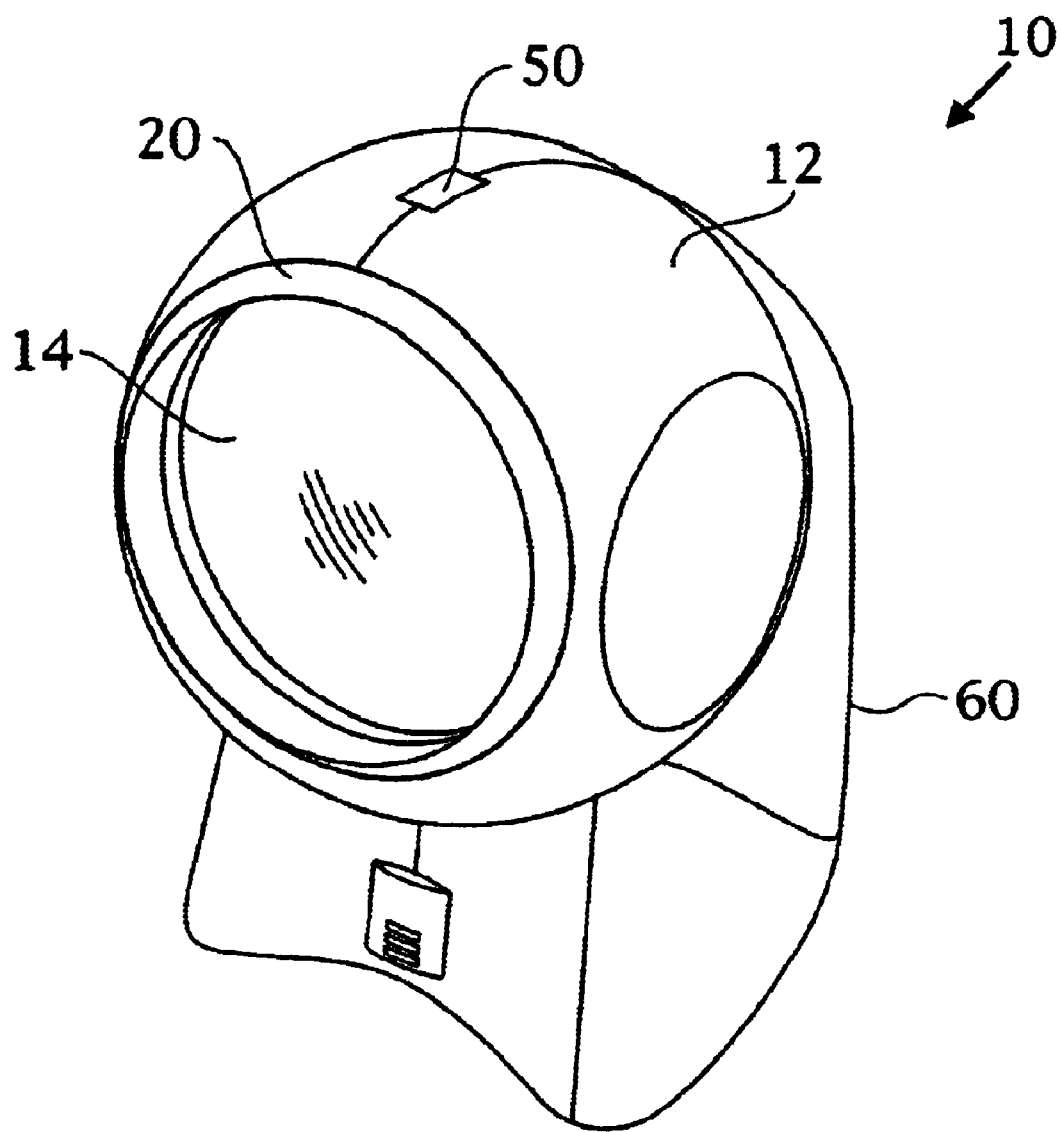
FIG. 1 is a perspective view of a presentation bar code symbol scanner 10 having an omnidirectional laser scanning platform mounted in the head portion of a multi-purpose hand-supportable/free-standing housing according to one embodiment of the present invention.

FIG. 1 is a perspective view of a portable bar code scanner 10 incorporating an omnidirectional laser scanning platform according to one embodiment of the present invention. The scanner 10 generally includes a scanning head 12 that is rotationally connected to a base unit 60. The scanning head 12 houses all associated optical components of the omnidirectional laser scanning platform as will be described in detail hereinafter.

Figure 2:
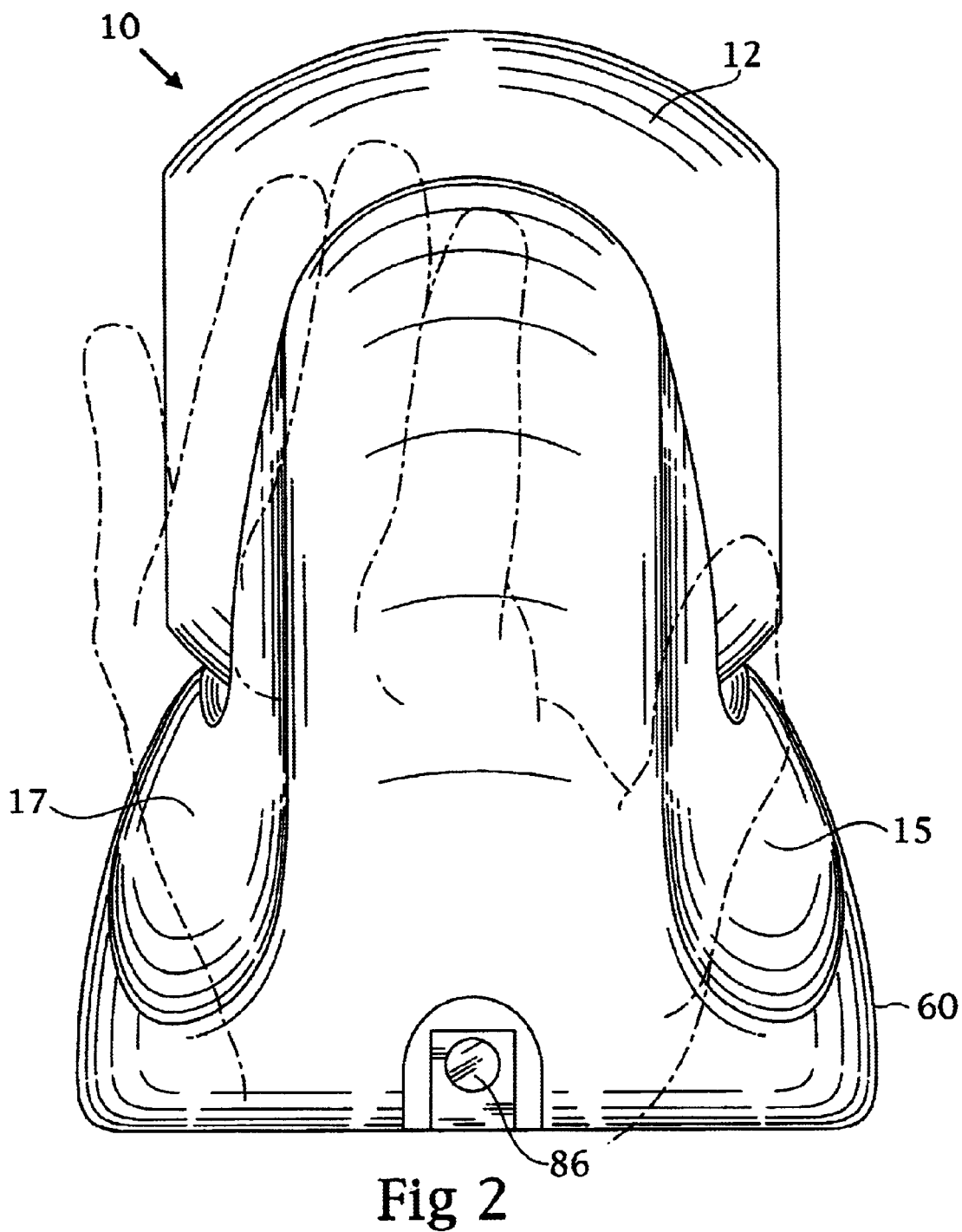
FIG. 2 is a rear view of the presentation bar code symbol scanner 10 of FIG. 1.
Figure 3:
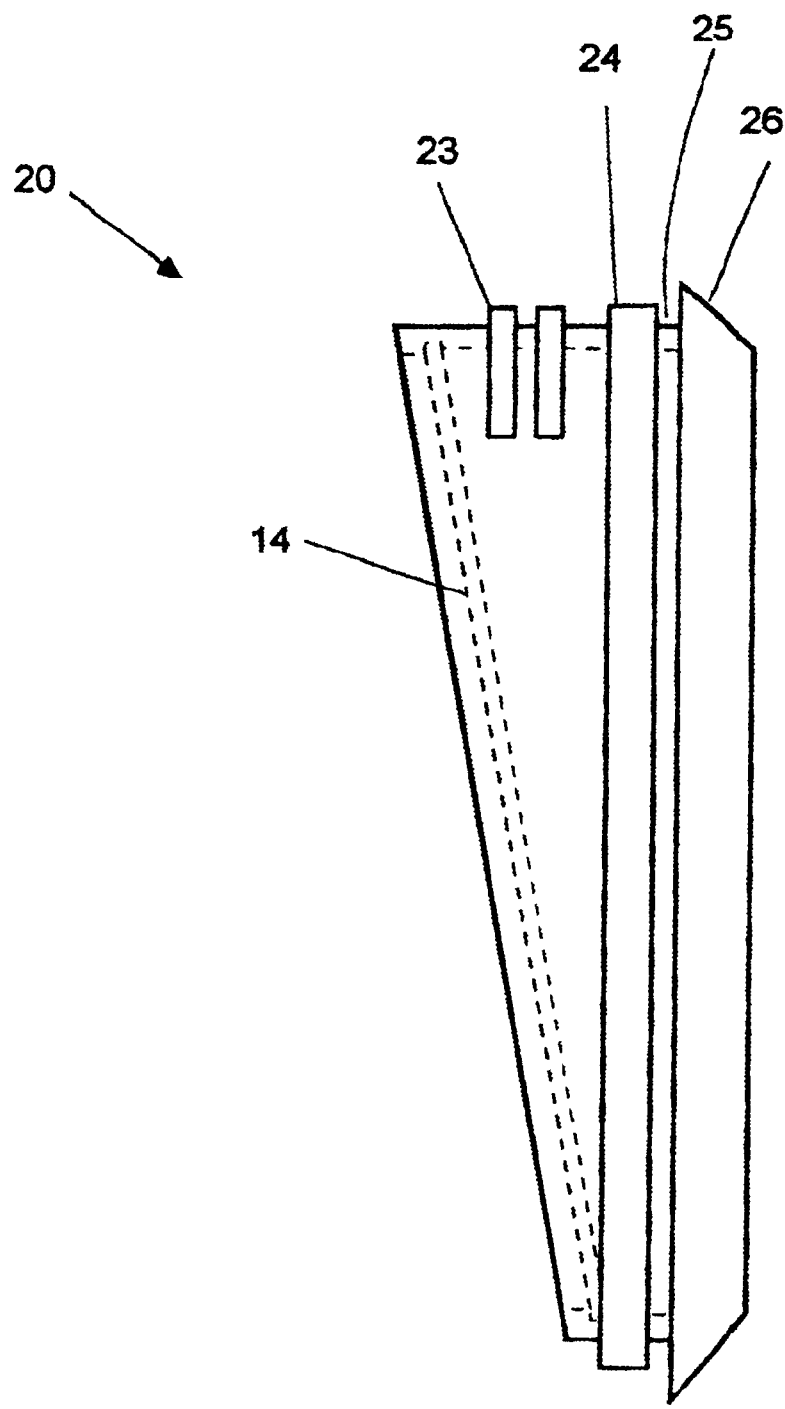
FIG. 3 is a side view of a circular housing bumper 20.

FIGS. 1 through 4 show the general construction of the scanner housing. The scanning head 12 has an aperture 11 through which an omnidirectional scanning pattern is projected. The scanning head 12 is formed in a generally spherical configuration with a flat front window 14 and top-mounted LED power and good read indicator 50. The head unit 12 is preferably molded of hard plastic or the like, and can be formed in two half-sections with tongue-and-groove edges for an interlocking fit. The scanning window 14 is generally round in configuration and mounted in a circular housing bumper 20, which is in turn mounted in the aperture 11 in the scanning head 12. As shown in FIG. 3, the window 14 is seated at an angle within a groove (not shown) formed in the housing bumper 20.

The housing bumper 20 has a beveled outer lip 26 and an inner lip 24 with a channel 25 formed therebetween. The channel 25 engages the inner edge of the aperture 11 of the scanning head 12. Additionally the housing bumper has a pair of locking rib members 23 which further engage a corresponding protrusion 21 on the interior of the scanning head 12. The combination of the channel 25 and the locking rib members 23 acts to secure the window 14 and the housing bumper 20 to scanner housing 10. The housing bumper 20 acts to protect the front of the scanner head 12 and to cushion the scanning window 14 against damage if the unit dropped or banged. The window 14 is a round section of transparent acrylic-type plastic with optical filtering properties such as described in detail in U.S. Pat. No. 5,627,359 (the '359 patent being commonly owned by Metrologic Instruments, Inc. and incorporated herein by reference). The size and shape of the scanning window and housing bumper can be varied from the size and shape shown without changing the performance of the scanner.

Figure 4:
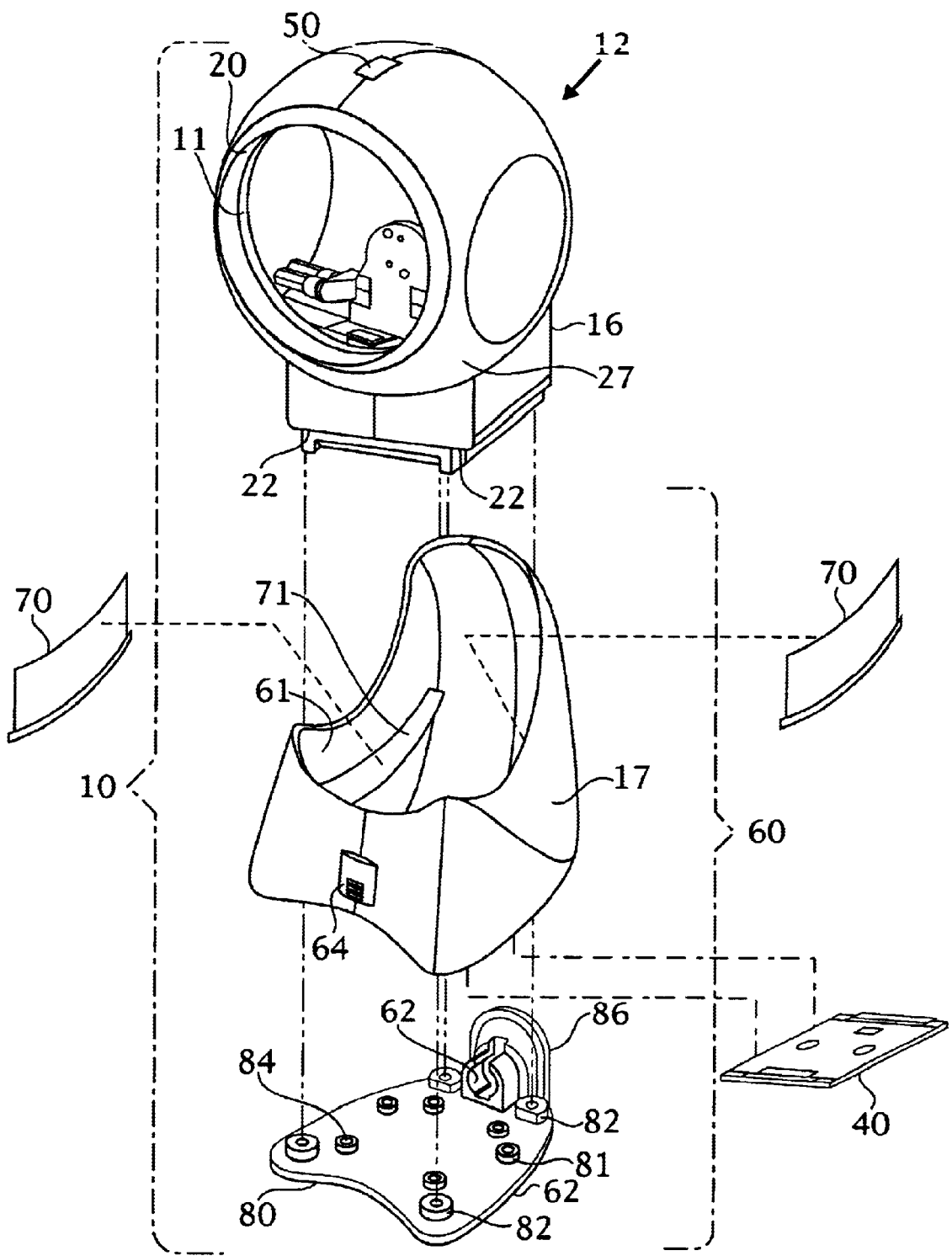
FIG. 4 is an exploded perspective view of the scanner 10 of in FIGS. 1–3.

FIG. 2 is a rear view and FIG. 4 is an exploded view of the scanner 10 of FIG. 1 in which the improved ergonomics of the design are apparent. The base unit 60 has a contoured top opening 61 for receiving a neck portion 16 of the substantially spherical scanning head 12. The contour of the opening 61 is curved upward to provide ergonomic support for the spherical scanning head 12 and an aesthetically pleasing scanner 10 (as was shown and claimed in Applicant's corresponding U.S. Design Pat. No. D 408,806). The bottom portion of the base unit 60 has contoured lateral recesses 15 and 17 on opposing sides to provide thumb and finger grips as shown in FIG. 2. During hand-supported operation of the scanner 10, the user can easily grip the scanner 10 in one hand by the contoured lateral recesses 15 and 17 and lift it off of a countertop surface to scan a large or bulky item.

FIG. 4 details the component parts of the scanner housing and their assembly into the scanner 10. As shown, the neck portion 16 of the scanning head 12 is inserted into the contoured opening 61 in the base unit 60. Base unit 60 rotationally supports the head unit 12 and houses a printed circuit board ("PC board") which includes circuitry and electronics related to the functions digitizing, decoding, formatting and transmitting bar code symbol character data produced in the scanning head 12. Other related circuitry which cannot be supported in the scanning head 12 can also be located on the PC mounted in the base unit 60. The scanning head 12 can easily be pivoted about a horizontal axis with respect to the base 60 allowing a user to position the scanning window 14 and therefore the projected scan pattern in a plurality of directions.

The neck portion 16, once inserted into base unit 60, rests atop two opposing guide-rails 70 mounted on the interior side walls of base unit 60. The guide rails 70 snap fit onto correspondingly-shaped protrusions 71 formed in the interior side walls of base unit 60. The guide rails 70 are formed of smooth plastic and provide direct support and cushioning for the scanning head 12. The underside of neck 16 has a pair of arcuate indentations 22 on opposite sides of the neck. The guide rails 70 are curved to conform to the indentations 22 on the underside of neck 16 and in general to the spherical outer surface of the scanning head 12.

Figure 14:
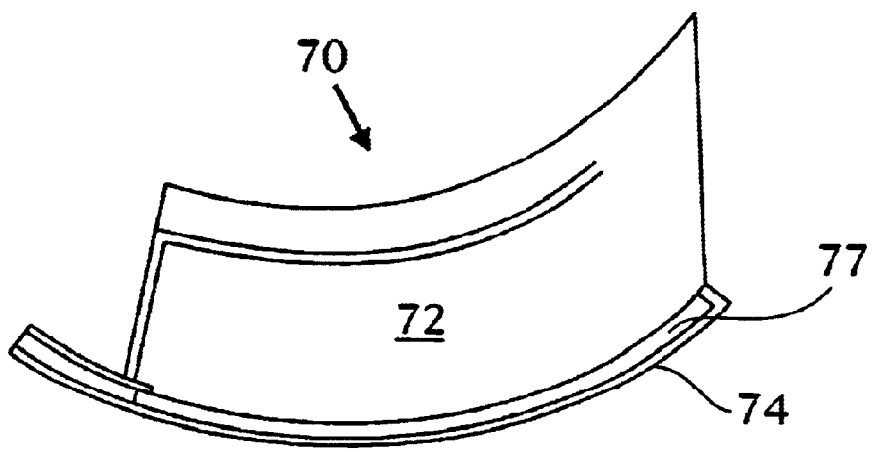
FIG. 14 is a side view of a slide rail 70 of FIG. 5.
Figure 15:
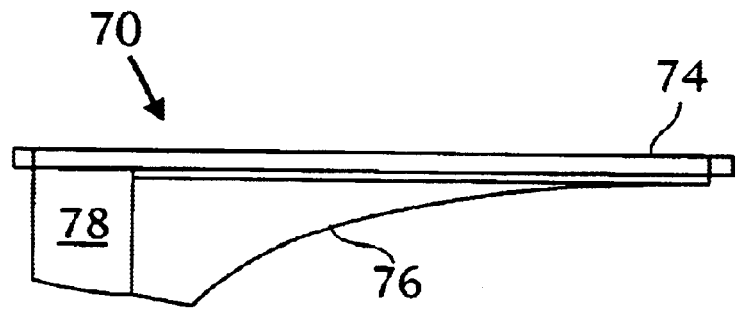
FIG. 15 is a top view of the slide rail 70 of FIG. 14.
Figure 16:
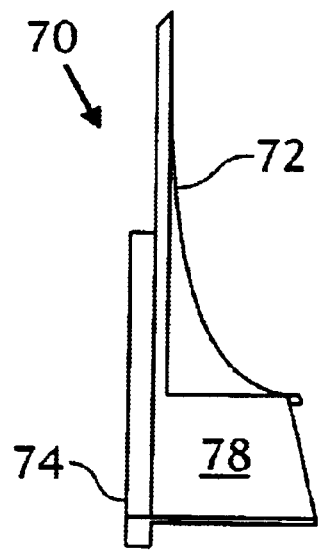
FIG. 16 is a front view of the slide rail 70 of FIGS. 14 and 15.

FIGS. 14, 15 and 16 are a side view, top view and front view, respectively, of the right-side guide rail 70 which is exemplary of both guide rails. Guide rail 70 is an arcuate bracket that snap fits onto a correspondingly-curved protrusion 71 formed on the interior side walls of the scanning head 12 via a groove 77 formed along the bottom edge of the guide rail.

Each guide rail 70 has a planar side-wall portion 72, a front spacer bracket 78, a reinforcing rib 76, and an arcuate slide rail 74 protruding laterally from the bottom edge of each side-wall portion 72. Slide rail 74 is the exterior of groove 77. Once the groove 77 has been fitted to protrusion 71, slide rail 74 extends into the center of the base unit 60.

When the guide rails 70 are attached to the interior of the base unit 60, opposite each other, they provide slidable support for the neck portion 16 and the scanning head. The indentations 22 formed in the side of neck portion 16 rest on slide rails 74. The exterior spherical surface 27 of the scanning head 12 rests on the upper edge of the side-wall portion 72 of guide rails 70. When scanning head 12 is rotated about a horizontal axis, the indentations 22 in neck 16 slide against the slide rails 74 of the guide rails 70. The front spacer bracket 78 and reinforcing rib 76 further act to support, position and cushion the scanning head 12 on the base unit 60.

Figure 5:
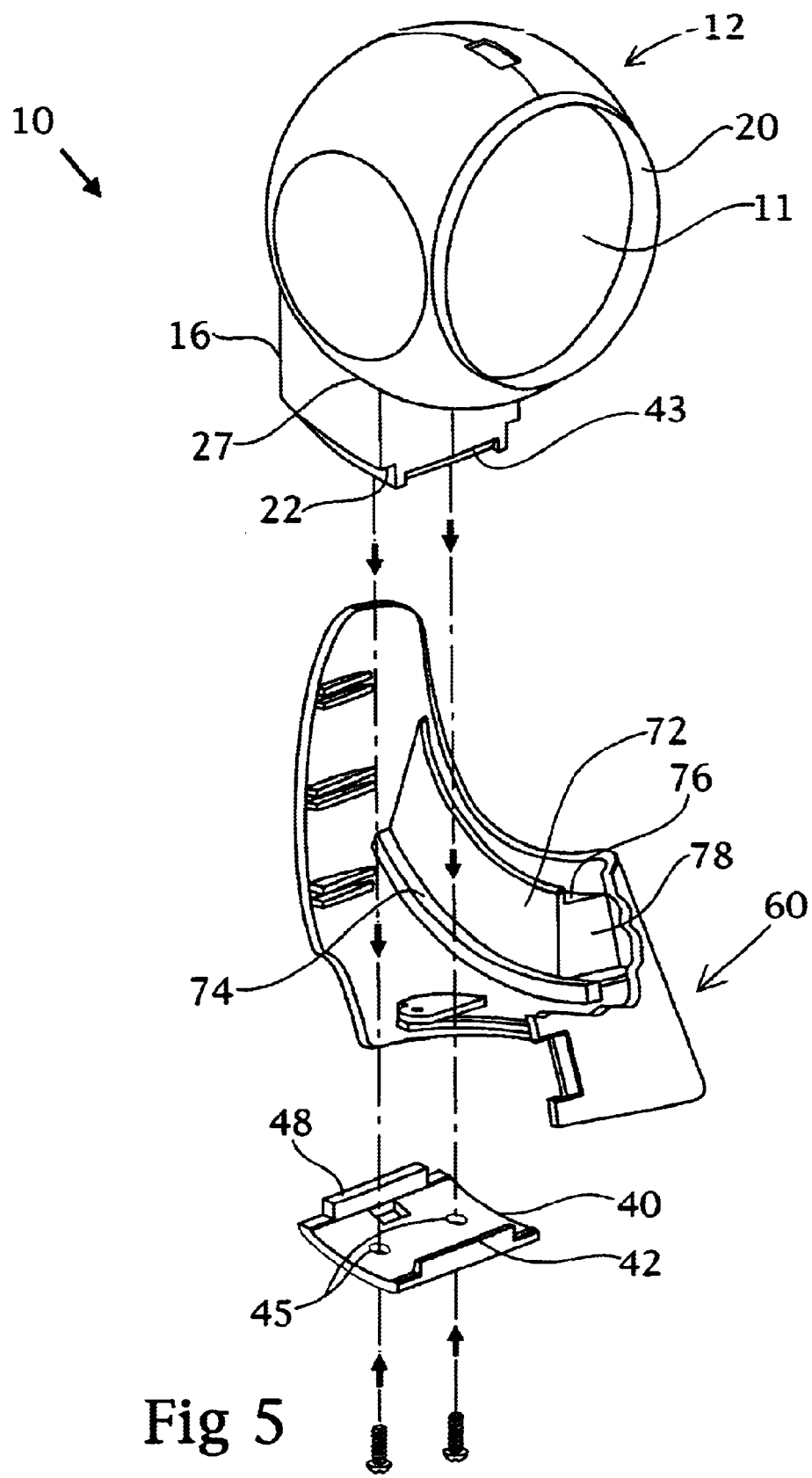
FIG. 5 is an exploded perspective view of the scanner 10 showing a cross-sectional view of the base unit 60.

As seen in FIGS. 4 and 5, a guide plate 40 attaches to the underside of neck portion 16, and guide plate 40 traverses the opposing guide rails 70 to moveably connect the scanning head 12 to the base unit 60, thereby pivotally securing the scanning head 12 to the base unit 60.

Figure 12:
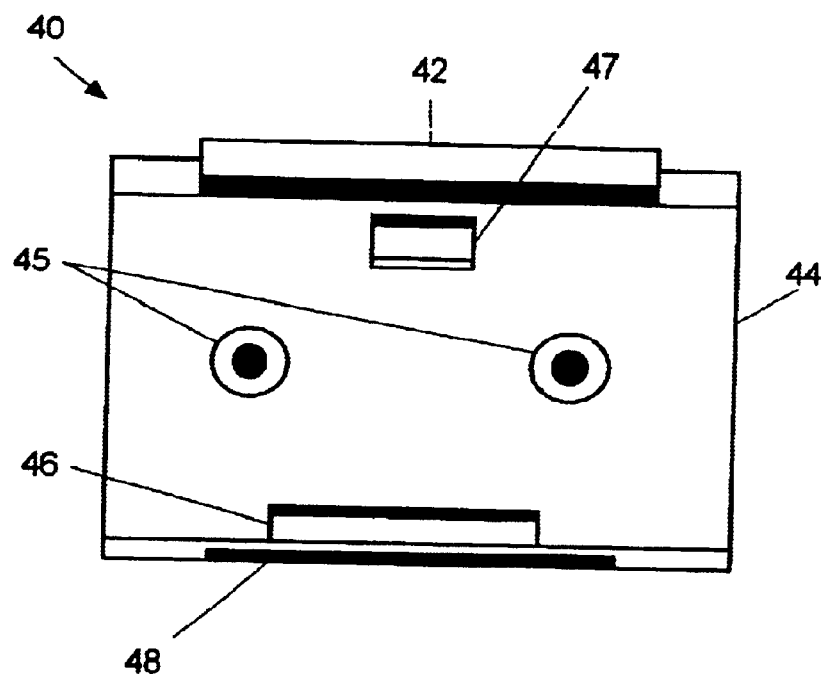
FIG. 12 is a top view of guide plate 40 of FIGS. 4 and 5.
Figure 13:
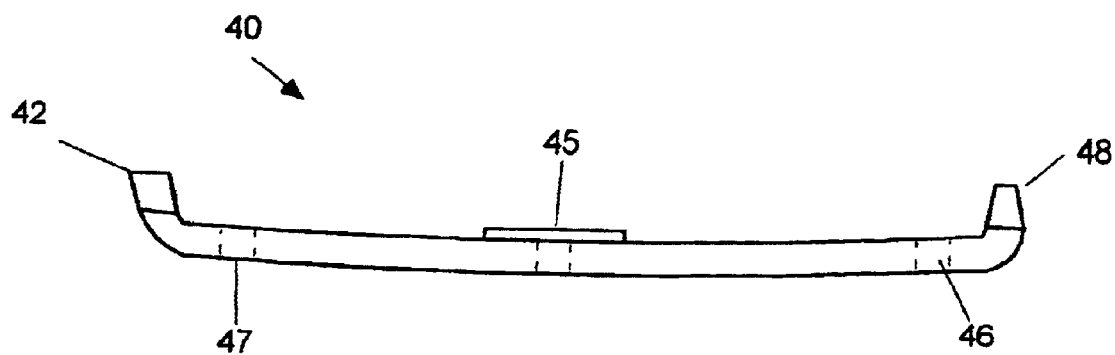
FIG. 13 is a side view of the guide plate 40 of FIG. 12.

FIGS. 12 and 13 are a top view and a side view, respectively, of guide plate 40. Guide plate 40 is a substantially rectangular panel that has a pair of parallel tabs 42 and 48, front and back, that fit within corresponding notches 43 on the underside of neck 16 to position the guide plate 40, and two screw holes 45 to facilitate screw attachment to neck 16. Openings 46 and 47 allow for the pass through of electrical connections. During rotation of the scanning head 12, the guide plate 40 similarly slides against underside of slide rails 74 identical to the movement of the underside of the neck 16 against the top side of slide rails 74. When the neck 16 is seated on seated on guide rails 70, the indentations 22 rest against slide rails 74 and the neck fits snugly between the guide rails 70. During rotation of the scanning head, the guide rails 70 provide both lateral and elevational support for the scanning head 12. This support by the guide rails 70 prevents the outside of the scanning head 12 from constantly brushing against the curved opening 61 of the base unit 60, which in turn keeps the outside surface of the scanning head 12 from being scratched by the repetitive motion of rotating the head 12 with respect to the base 60.

Figure 9:
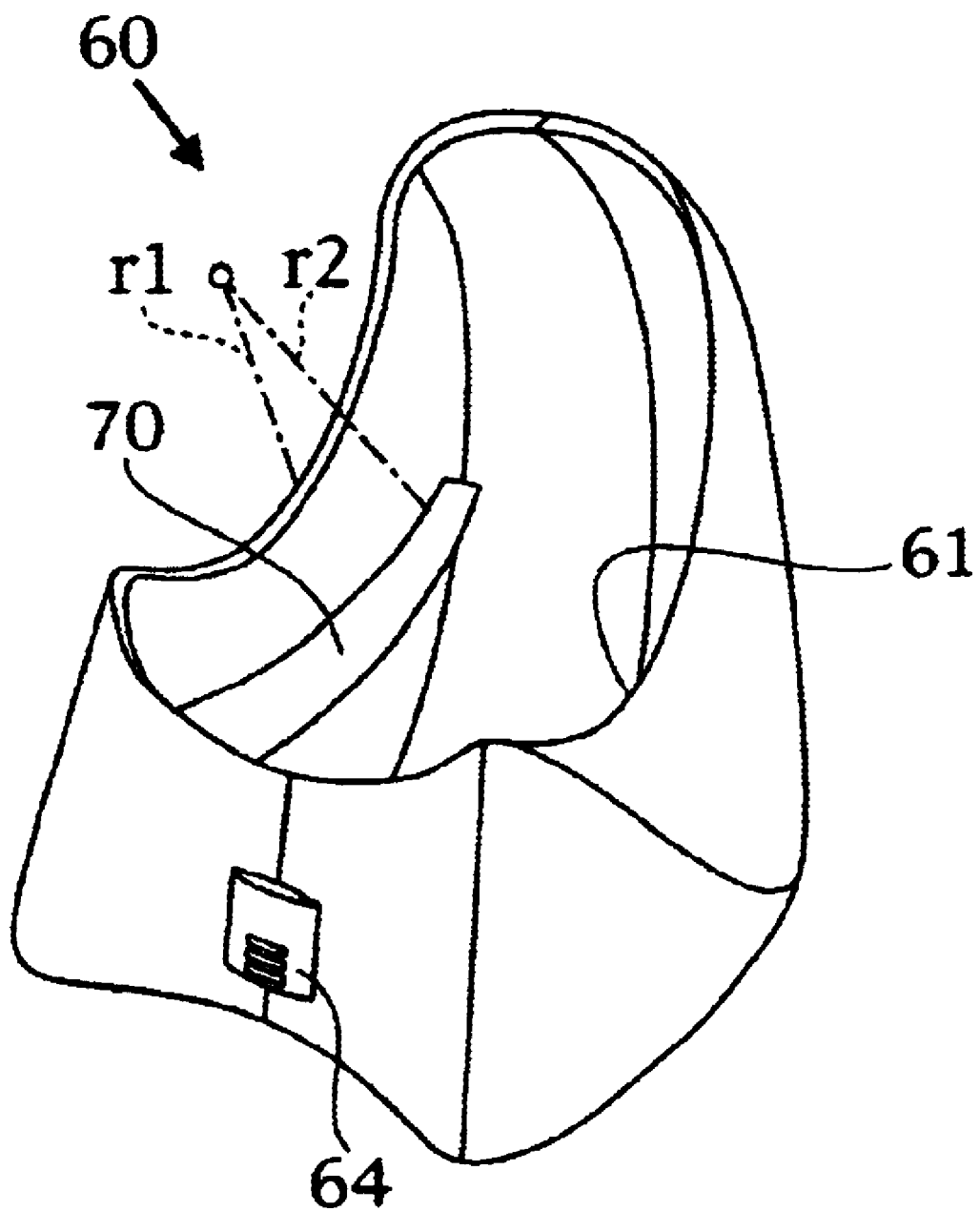
FIG. 9 is a perspective view of base unit 60.

FIG. 9 is a perspective view of base unit 60 with guide rails 70 installed therein. The curved configuration of the guide rails 70 and the opening 61 provides a first pivot point of radius r1 extending from the contoured opening 61 of base unit 60 about the horizontal axis of head unit 12, and a second pivot point of radius r2 extending from the guide rails 70 to the same horizontal axis of head unit 12. This dual-radius orbiting support configuration results in an extremely rugged and durable scanning unit in which the scanning head 12 pivots easily about a horizontal axis with little or no friction against the base unit 12. When used as a fixed scanner, the base unit 60 provides a well-balanced, stable and protected foundation for head unit 12, and yet very little counter space is needed.

Referring back to FIG. 4, a bottom plate 80 is a substantially planar member that attaches to the underside of base unit 60 by four screws through screw holes 82, thereby sealing it off. Rubber feet can be secured to the underside of bottom plate 80 to cover the screw heads and to improve the footing of the scanner. Additional screw holes 84 may be provided as desired to allow for mounting the scanner in a fixed manner to a countertop, wall or other fixed position. Preferably, a collar 86 protrudes upwardly from bottom plate 80 and fits into an opening provided in the base unit 60. The collar 86 has an opening 62 for the insertion of a power or communication cable. The bottom plate 80 and collar 86 are configured to fit flush with the bottom of base unit 60 with the collar 86 fitting snugly into opening 62. This configuration aids assembly and reinforces collar 86 to provide a rugged passage for electrical cabling.

The bottom plate 80 additionally provides support for a second PC board (not shown) which holds circuitry for digitizing, decoding, formatting and transmitting bar code symbol character data. Cabling also connects an analog signal processing board 52 (to be described) that is mounted in the scanner head 12 to a signal decoding board in the base unit 60. The cables are passed through openings formed in the neck portion 16 of the scanning head 12 and the guide plate 40.

The compact housing configuration described above yields a convenient, durable and ergonomic scanner package having a scanning head 12 that can be tilted vertically about a 30° angle with respect to the base unit 60. Thus, the scanner is structurally capable of an aggressive omnidirectional scan from a free-standing fixed position atop a counter or while handheld by a user.

The flexibility of the housing as described above is matched by an aggressive and reliable omnidirectional laser scanning platform. The scanning platform inclusive of all associated optical and electrical components is mounted in the head unit 12 and projects a pattern of scan lines through front window 14 onto a bar code to be read.

Figure 19:
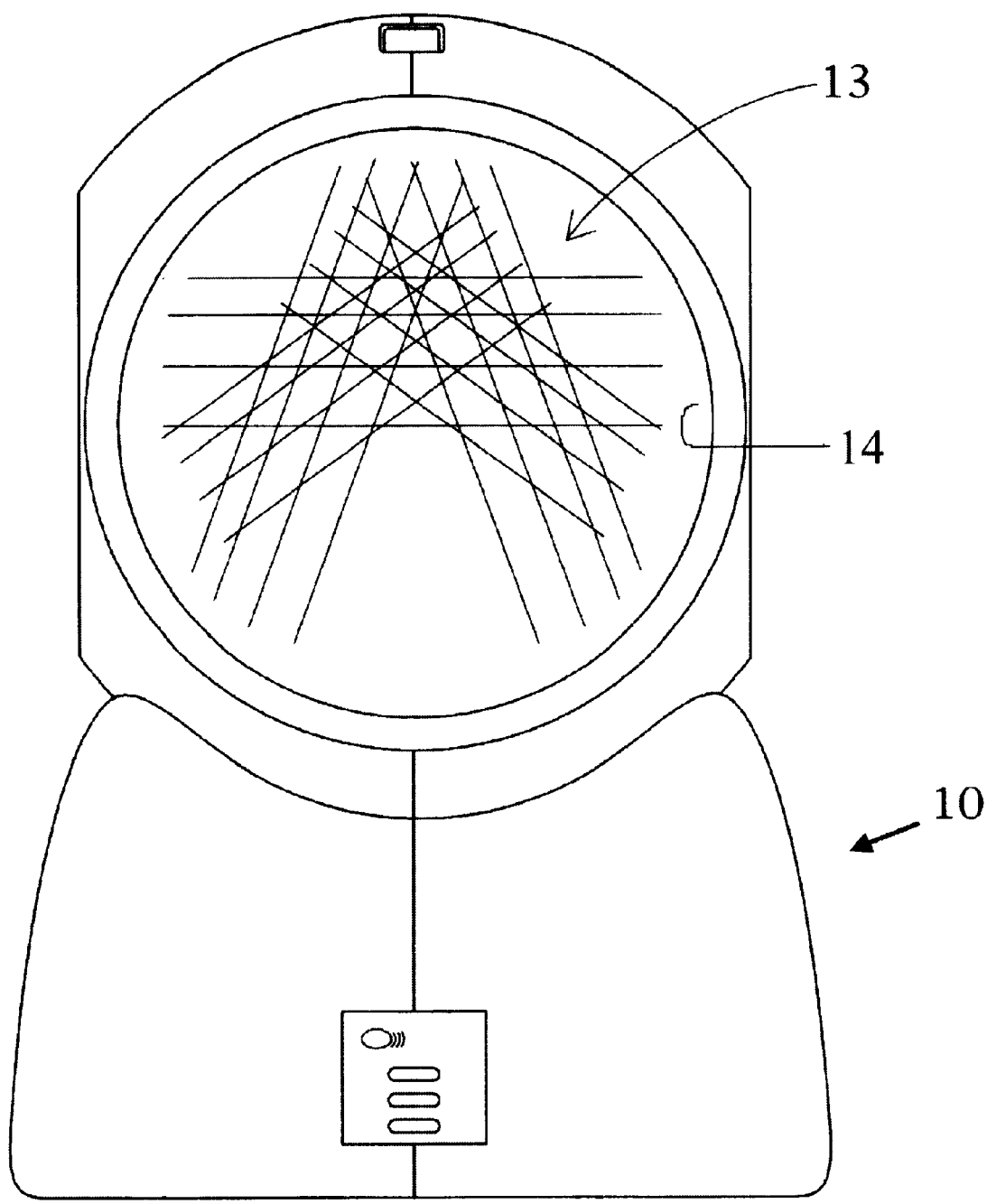
FIG. 19 is a front view of the scanner 10 showing the omnidirectional scanning pattern at the face of the unit.
Figure 20:
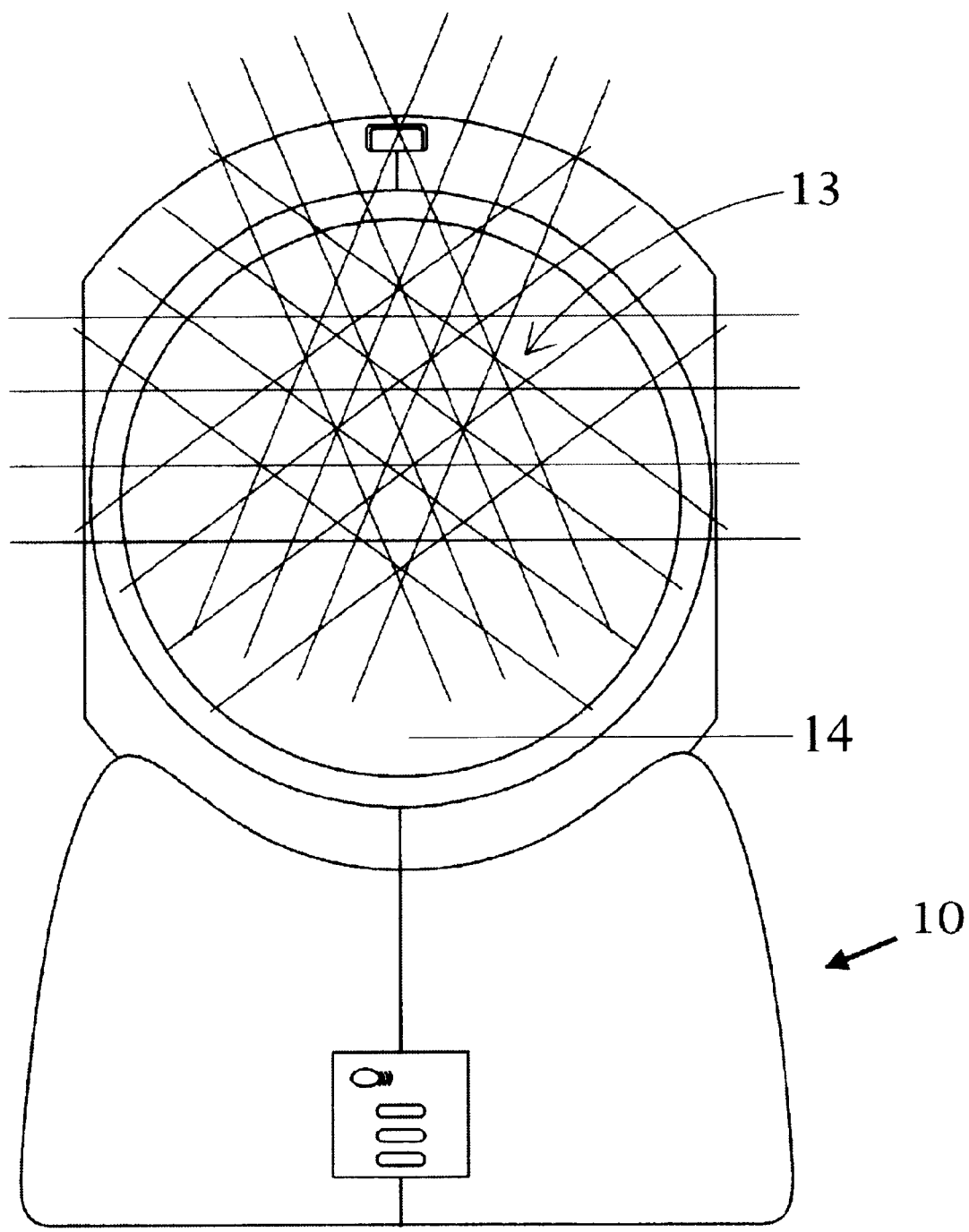
FIG. 20 is a front view of the scanner 10 showing the omnidirectional scanning pattern at 2.5 inches away from the face of the unit.

FIGS. 19 and 20 show the omnidirectional scanning pattern 13 as it is projected at the light transmission window 14 and 2.5 inches from the window 14 of the scanner 10.

Figure 6:
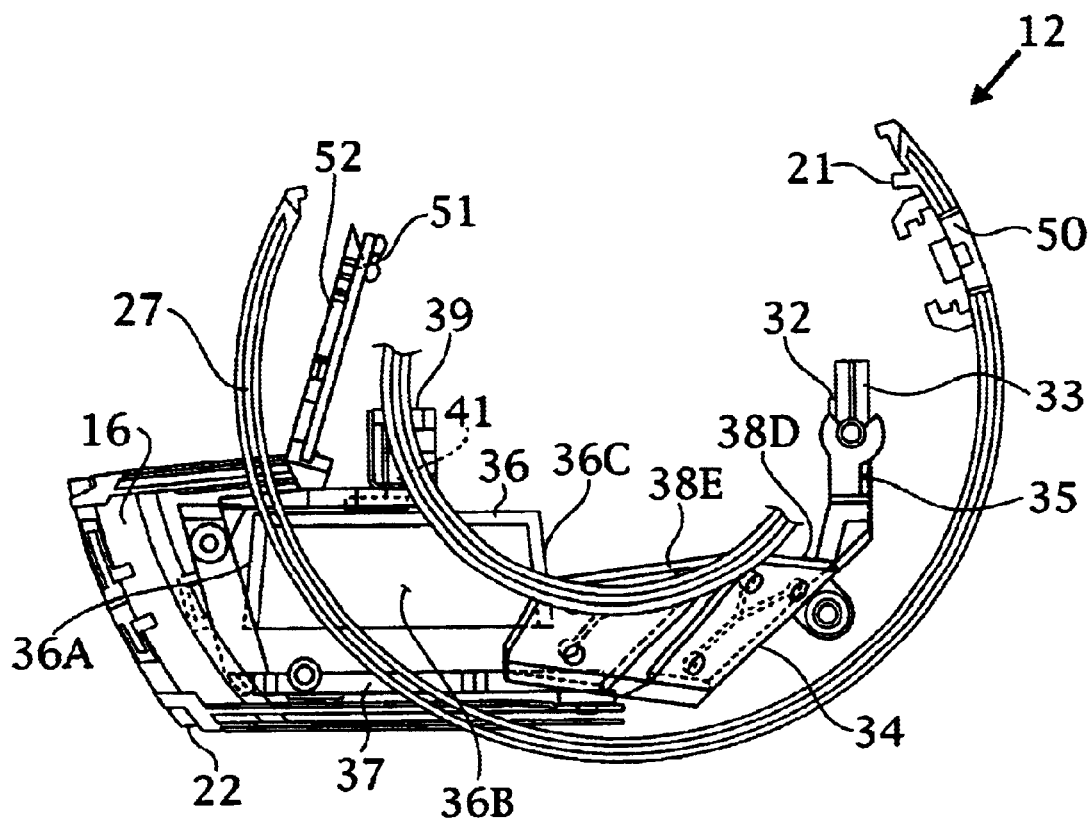
FIG. 6 is a side cross-sectional view of the scanning head 12 showing the internal component layout.
Figure 7:
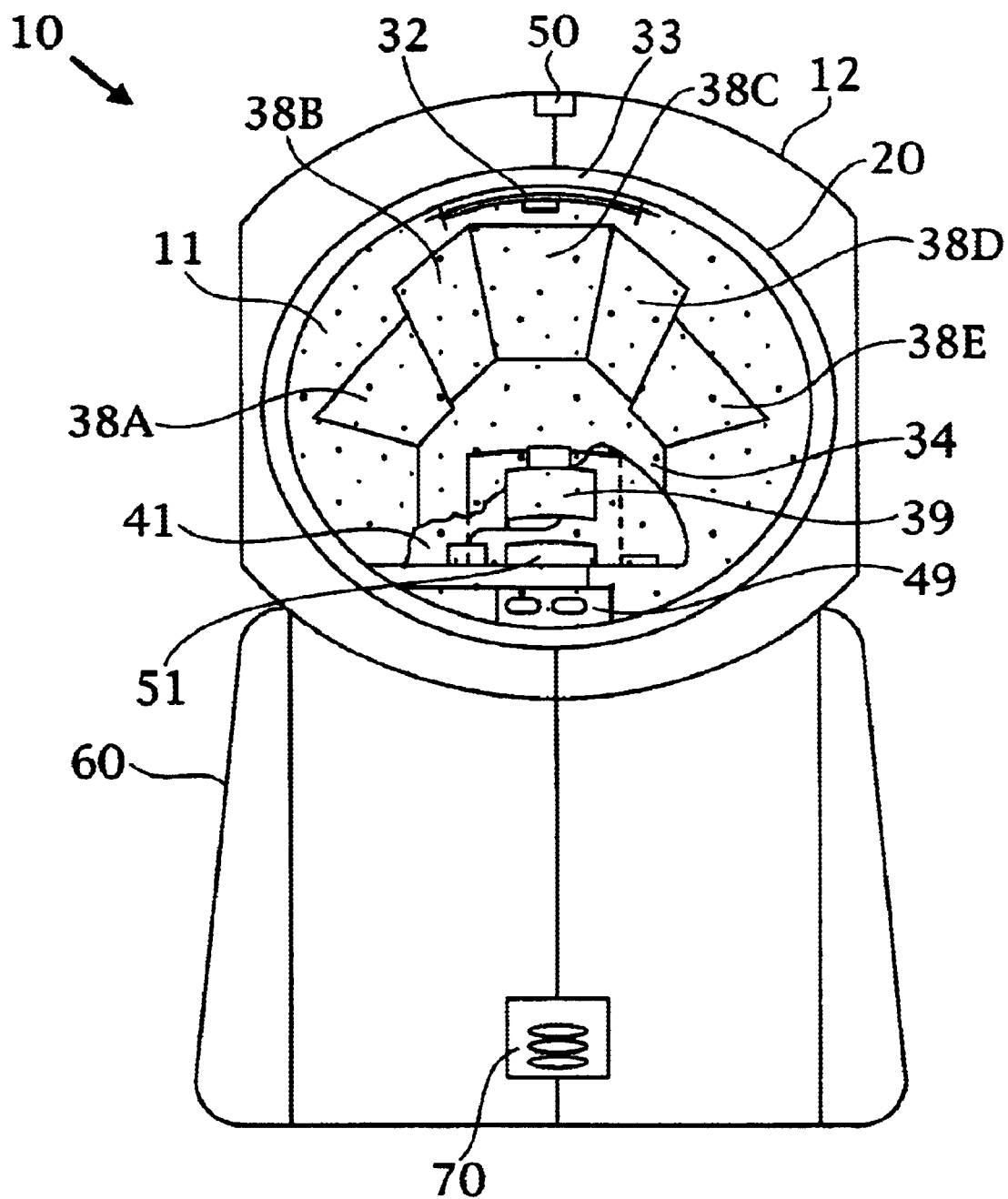
FIG. 7 is a front view of one embodiment of the scanner 10 showing the internal optical layout.
Figure 8:
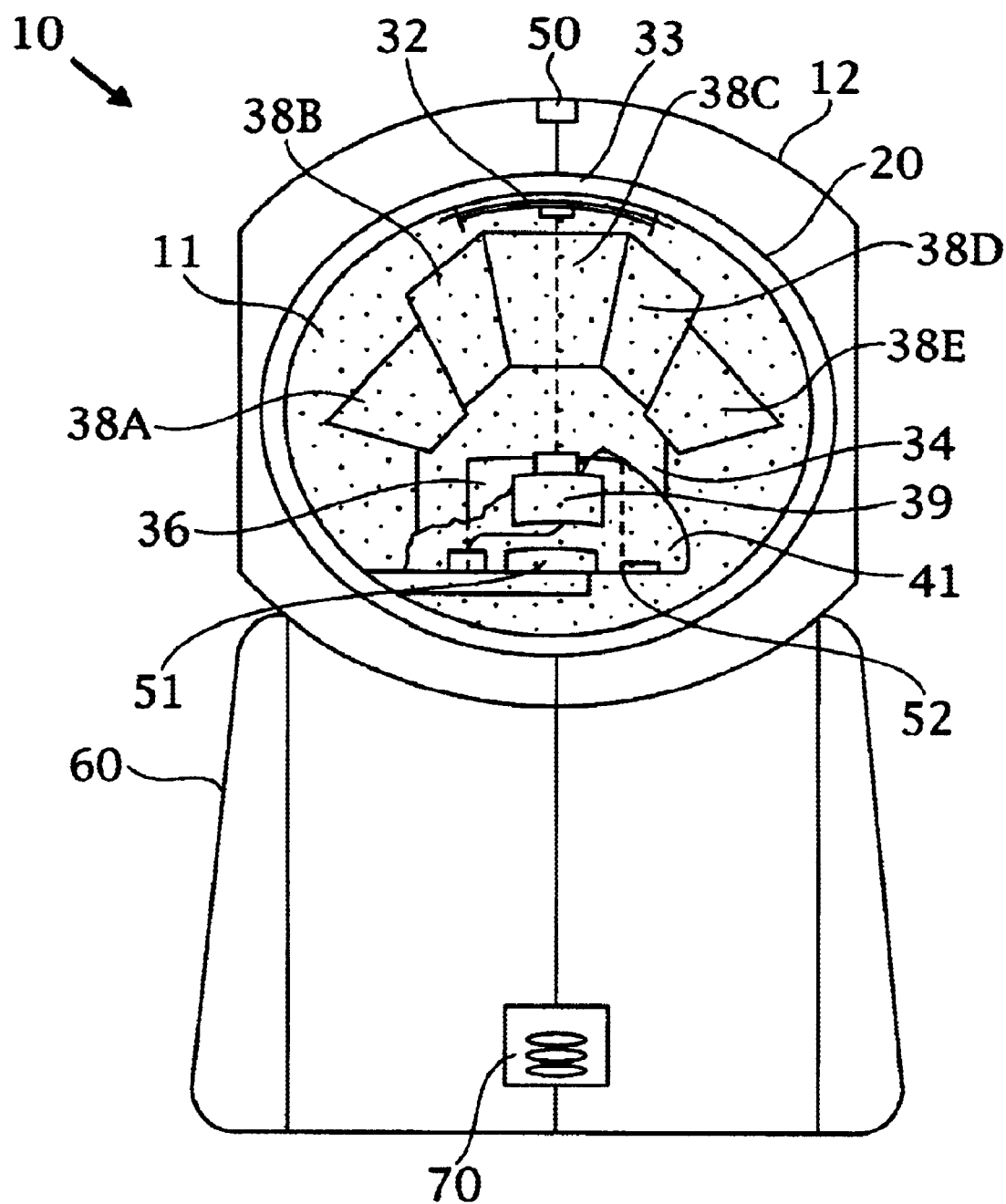
FIG. 8 is a front view of a second embodiment of the scanner 10 showing the internal optical layout.

The omnidirectional laser scanning platform of the present invention generally employs an optical layout that is substantially similar to the optical layout taught in U.S. Pat. Nos. 5,637,852 and 5,844,227, that are incorporated by reference herein. As shown in FIGS. 6 and 7 an exemplary laser scanning platform according to the present invention is mounted within the head portion 12 of the scanner housing 10. The laser scanning platform includes an assembly of subcomponents assembled upon an optical bench 34 with respect to a central longitudinal reference plane.

The subcomponents assembly includes: a scanning polygon 36 having four light reflective surfaces 36A, 36B, 36C and 36D, each disposed at a tilt angle with respect to the rotational axis of the polygon; an electrical motor 37 mounted on the optical bench and having a rotatable shaft on which polygon 36 is mounted for rotational movement therewith; an array of stationary mirrors 38A, 38B, 38C, 38D and 38E fixedly mounted with respect to the optical bench; a laser beam production module 39, fixedly mounted above the rotating polygon 36 for producing a laser beam having a circularized beam cross-section, and essentially free of astigmatism along its length of propagation; an analog signal processing board 52 fixedly mounted over the rotatable polygon 36 and carrying a photodetector 51 for detecting reflected laser light and producing an analog signal, and signal processing control circuits 53 for performing various functions, including analog scan data signal processing; a light collecting mirror 33, disposed above the array of stationary mirrors 38 for collecting light rays reflected off the rotating polygon 36 and focusing the same onto the photodetector 51 on the analog signal processing board 52; and a beam directing surface 32, realized as a flat mirror mounted on the light collecting mirror for directing the laser beam from the laser beam production module 39 to the rotating polygon 36 disposed there beneath.

The laser beam production module of the present invention could be accomplished by employing a system of a lens and aperture as is well known in the art, a system which employs a plurality of diffractive optical elements (DOEs) for modifying the size and shape of the laser beam. Various embodiments of DOE-based laser beam production modules are shown and described in co-pending application Ser. No. 09/071,512 filed on May 1, 1998, commonly owned by the applicant hereof and incorporated by reference herein.

Figure 17:
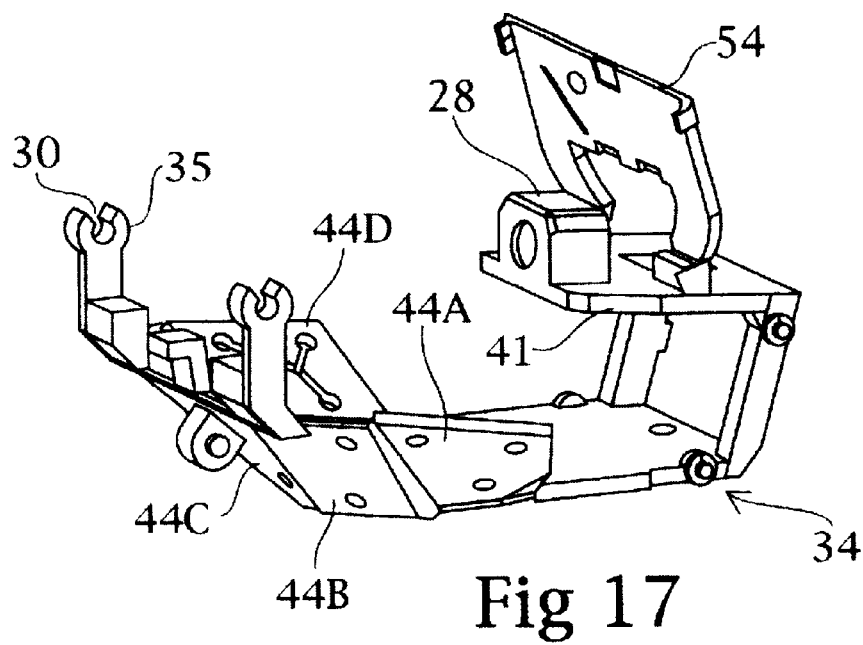
FIG. 17 is a perspective view of the optical bench 34 of FIG. 6 stripped of optical components.
Figure 17A:
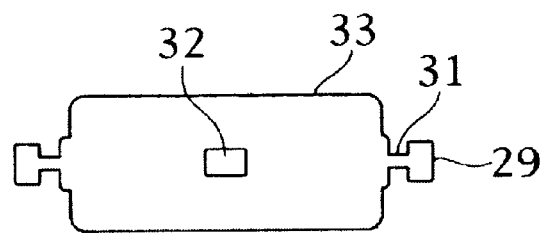
FIG. 17A is a top view of the light collecting mirror 33.
Figure 18:
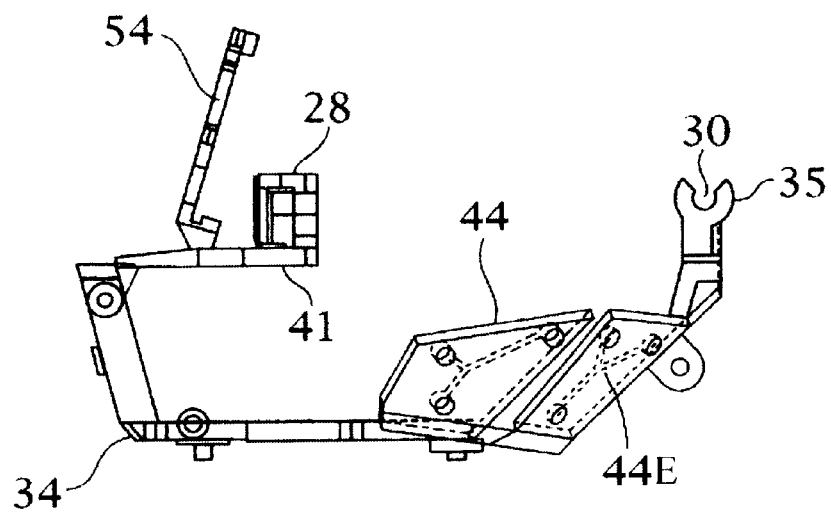
FIG. 18 is a side view of the optical bench 34 of FIG. 17.

In FIGS. 17, 17A and 18, the optical bench 34 is shown in greater detail, with the polygon 36, scanning motor 37, laser beam production module 39, collector mirror 33, and stationary mirror elements 38A through 38E removed for illustration purposes. As shown, stationary mirror brackets 44A through 44E are formed integral to the optical bench 34 for mounting the stationary mirrors thereon.

FIG. 17A is a top view of the light collecting mirror 33. The collector mirror 33 attaches to a collector bracket 35 by means of a pair of integrally-formed pivot arms 30 with distal hubs 29. The pivot arms 31 of collector mirror 33 snap fit into notches 30 formed in collector mirror bracket 35, and hubs 29 maintain the pivotal seating. With additional reference to FIG. 6, the beam directing surface 32 which is mounted to the collector mirror 33 must be aligned with the laser beam that is produced by the laser beam production module 39 during the manufacturing calibration process. Moreover, the collector mirror 33 must also be aligned for the efficient collection of returned light. The pivoting collector mirror 33 allows for easy and infinite adjustment of the collector mirror 33, and thus the beam directing surface 32, along the vertical direction during manufacturing. The snug fit between the bracket notches 30 and the pivot arms 31 of the mirror allows for an assembler to adjust the position of the mirror while preventing further unintentional movement of the mirror after the alignment is complete.

In an alternative embodiment, the collector mirror 33 is mounted for dual-axis adjustment. This is accomplished by mounting the collector mirror 33 in a rectangular mirror frame (not shown) with pivot points at top and bottom. The collector mirror frame itself has additional pivot arms on the sides for fitting into the notches 30 of mirror bracket 35 (similar to the pivot arms shown integral to mirror 33 in FIG. 17A). This combination of pivot points both at the top and bottom of the mirror and on the sides of the mirror frame provides for adjustment of the mirror in both a right-to-left direction as well as the up-and-down direction provided for in the scanner embodiment detailed above. In both cases, the pivoting collector mirror 33 can be adjusted and calibrated at the factory. If desired, the pivot points of the collector mirror 33 can be fixed by gluing after calibration.

Referring to FIGS. 6, 17 and 18, at the opposite end of the optical bench 34 the laser beam module support bench 41 is formed at a height above the mirror bracket array 44. This allows for mounting of the polygon 36 and rotating motor 37 below the laser beam production module 39. The laser beam production module 39 is mounted in the laser module mount bracket 28. The analog signal processing board 52 attaches to PC board bracket 54, above and behind the laser module mount bracket 28. The entire optical bench 34 is a single piece molded plastic unit, which holds all of the components that make up the omnidirectional laser scanning platform.

In the preferred embodiment of the invention the collector mirror 33, beam directing surface 32, laser beam production module 39 and photodetector 51 are mounted above the rotating polygon 36 and mirror array 38. However, it is within the scope of the invention to reverse the orientation of these components with respect to each other.

Having described the physical construction of the laser scanning platform of the present invention, it is appropriate at this juncture to describe the manner in which the laser scanning pattern is produced. A laser beam is produced from the laser beam production module 39 and is directed towards the beam directing surface 32 mounted on the light collector mirror 33. The laser beam reflects from the beam directing surface 32 towards the mirrored facets on the rotating scanning polygon 36. As the polygon spins, the incident laser beam reflects off the rotating mirrors 36A through 36D and sweeps the laser beam about its rotational axis along a plurality of different paths which intersect the stationary array of mirrors 38A through 38E on the optical bench 34. During each revolution of the scanning polygon 36, the laser beam reflects of the rotating mirrors and is repeatedly swept across the array of stationary mirrors thereby producing first, second, third, fourth and fifth groups of plural scan lines, respectively. Each scan line in each group of scan lines is substantially parallel to each other scan line in that group of scan lines. The intersection of the groups of parallel scan lines produces a highly collimated scanning pattern. The scan lines that make up this highly collimated scanning pattern 13, as shown in FIGS. 19 and 20, are projected out through the light transmission window and intersect about a projection axis that extends outward from the light transmission window 14 to produce a highly confined narrow scanning volume. Within this narrowly confined scanning volume a bar code symbol can be scanned omnidirectionally, while preventing unintentional scanning of code symbols on objects located outside of the scanning volume.

When a bar code symbol on an object is presented to the highly collimated scanning pattern 13 projected through a narrowly confined scanning volume the bar code symbol is scanned independent of its orientation in the scanning volume. At least a portion of the laser light reflected from the scanned code symbol is directed through the light transmission window 14, reflected off the stationary array of mirrors 38, reflected off the rotating polygon 36, focused by the light collection mirror 33 onto the photodetector 51, whereupon an electrical signal is produced for use in decode signal processing.

The omnidirectional laser scanning platform of the present invention can be automatically activated or can include manual activation means. Manual activation means can include a trigger or other switch located on the exterior of the scanner housing which when depressed activates the laser, the laser scanning mechanism, the photoreceiving circuitry and decoding circuitry. Laser bar code scanning systems employing manual activation means are well known in the art. Various embodiments of automatically-activated bar code symbol scanning systems are detailed in FIGS. 10, 10A, 11 and 11A. A number of the subsystems are common to all embodiments and are thus described in detail with respect to FIG. 10 only. However, the description of these subsystems applies similarly when they are included in the other listed embodiments.

Figure 10:
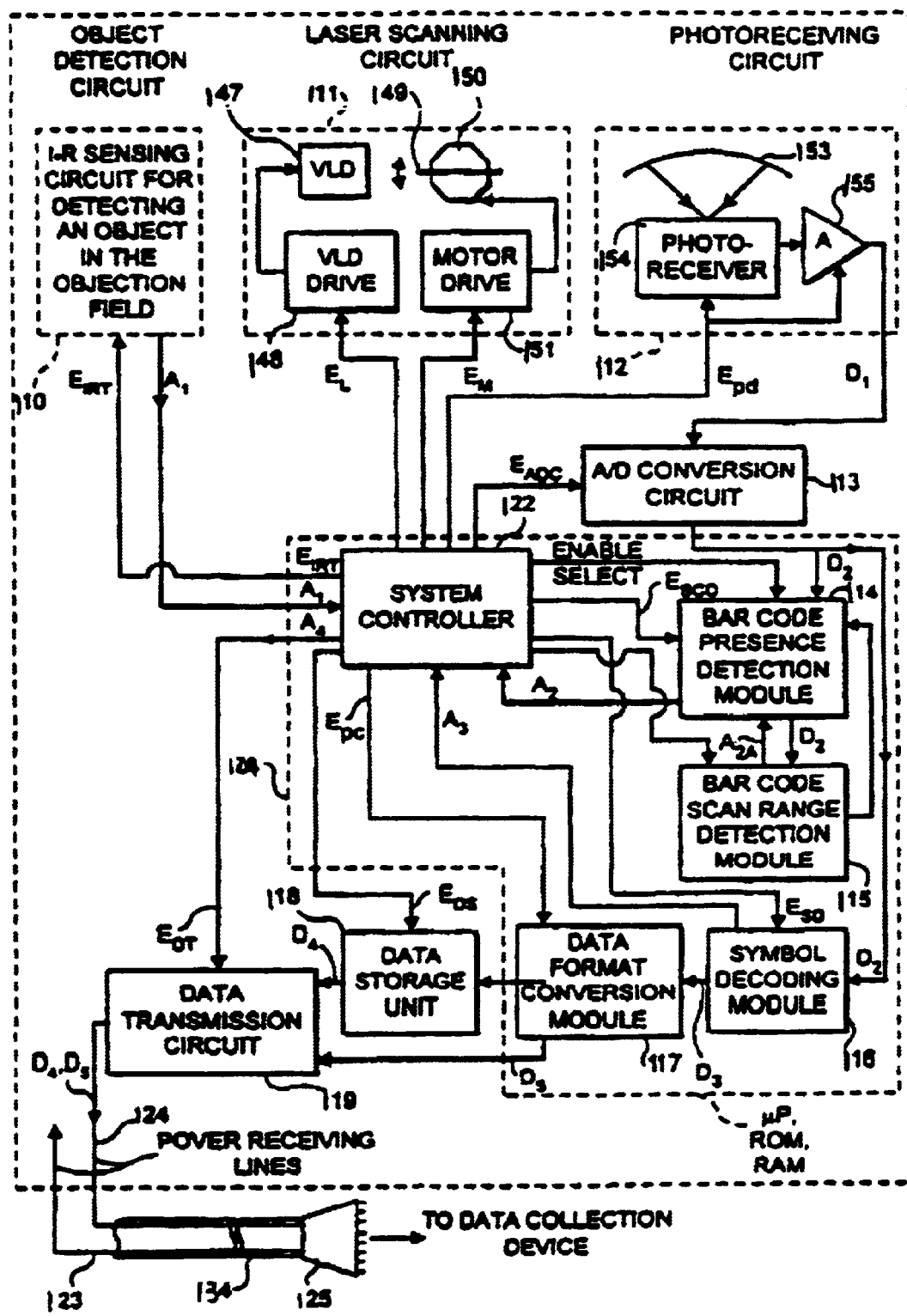
FIG. 10 is a schematic block diagram of first exemplary embodiment of the automatically-activated scanning system of the present invention.

As indicated in FIG. 10 an automatically activated bar code symbol scanning system of the first design is composed of a number of subsystems, an infrared (IR) based object detection subsystem 112 as taught in prior U.S. Pat. Nos. 5,260,553, 5,340,971 and 5,808,285, incorporated herein by reference; a scanning means 111, a photoreceiving circuit 112, analog-to-digital conversion circuit 113, a bar code presence detection subsystem 114 as taught in prior U.S. Pat. Nos. 5,484,992 and 5,616,908 incorporated herein by reference, bar code scan range detection module 115, symbol decoding module 116, data format conversion module 117, symbol character data storage unit 118, and a data transmission circuit 119. As illustrated, these components are operably associated with a programmable system controller 122 which provides a great degree of versatility in system control, capability and operation.

In accordance with the present invention, the purpose of the object detection subsystem is to perform the following primary functions during object detection: (i) automatically and synchronously transmitting and receiving pulse infrared (IR) signals within an IR-based object detection field; (ii) automatically detecting an object in a least a portion of the IR-based object detection field by analysis of the received IR pulse signals; and (iii) in response thereto, automatically generating a first control activation signal A1 indicative of such automatic detection of the object within the object detection field. As shown in FIG. 10, the first control activation signal A1 is provided to the system control subsystem 122 for detection, analysis and programmed response.

As illustrated in FIG. 10, the scanning circuit 111 includes, a light source 147 which is shown as a solid state visible laser diode (VLD), but can be any source of intense light suitably selected for maximizing the reflectivity from the object's surface bearing a bar code symbol, a scanning mechanism 150 such as a rotating polygon which is mounted on a rotating motor driven by motor drive 151.

To selectively activate the laser light source 147 and scanning mechanism 150, upon receiving control activation signal A1, the system controller provides laser diode enable signal $E_L$ scanning mechanism enable signal $E_M$ as input to driver circuits 148 and 151 respectively. When signals $E_L$ and $E_m$ are at a logical high level the VLD is activated and the beam is scanned through the light transmission aperture and across the scan field.

When an object such as a product bearing a bar code symbol is within the scan field at the time of scanning, the laser beam incident thereon will be reflected. This will produce a laser light return signal of variable intensity which represents a spatial variation of light reflectivity characteristic of the spaced apart pattern of bars comprising the bar code symbol. Photoreceiving circuit 112 is provided for the purpose of detecting at least a portion of laser light of variable intensity, which is reflected off the object and bar code symbol within the scan field. Upon detection of this scan data signal, photoreceiving circuit 112 produces an analog scan data signal $D_1$ indicative of the detected light intensity. Analog scan data signal $D_1$ is provided as input to A/D conversion circuit 113. As is well known in the art, A/D conversion circuit 113 processes analog scan data signal $D_1$ to provide a digital scan data signal $D_2$ which resembles, in form, a pulse width modulated signal, where logical "1" signal levels represent spaces of the scanned bar code symbol and logical "0" signal levels represent bars of the scanned bar code symbol. A/D conversion circuit 113 can be realized by any conventional A/D chip. Digitized scan data signal $D_2$ is provided as input to bar code presence detection module 114 and symbol decoding module 116.

The bar code presence detection module performs the following primary functions during bar code symbol detection: (i) automatically generating an omnidirectional visible laser scanning pattern within the bar code symbol detection field defined relative to the scanner housing, to enable scanning of a bar code symbol on the detected object; (ii) automatically processing scan data collected from the bar code symbol detection field and detecting the presence of the bar code symbol thereon; and (iii) automatically generating a control activation signal A2=1 indicative thereof in response to the automatic detection of the bar code symbol. As shown in FIG. 10, the second control activation signal A2 is provided to the system controller 122 for detection, analysis and programmed response.

The purpose and function of the bar code presence detection module is to determine whether a bar code is present or absent from the scan field over a time interval specified by the system controller, by detecting a bar code symbol "envelop" from digital scan data signal $D_2$ by analyzing the digital count and sign data in the signal. When a bar code symbol "envelop" is detected in the scan field, and the bar code presence detection module provides signal A2 to the system controller 122 which then causes the system to undergo a transition for the bar code presence detection state to the bar code reading state.

Within the context of the system design shown in FIG. 10, the bar code symbol decoding module 116 performs the following functions during the bar code symbol reading state: (i) automatically generating an omnidirectional visible laser scanning pattern within the scan field, to enable scanning of the detected bar code symbol therein; (ii) automatically decode-processing scan data collected from the scan field so as to detect the bar code symbol on the detected object; (iii) automatically generating a third control activation signal A3=1 indicative of a successful decoding operation, and producing decoded symbol character data representative of the detected and read bar code symbol. As shown in FIG. 10, the third control activation signal A3 is provided to the system controller 122 for detection, analysis and programmed response.

Upon receiving control activation signal A3, the system controller 122 generates and provides enable signals $E_{FC}$, $E_{DS}$, and $E_{DT}$ to the data format conversion module 117, data storage unit 118, and data transmission circuit 119, respectively at particular stages of its control program. Symbol decoding module 116 provides decoded symbol character data D3 to data format module 117 to convert data D3 into two differently formatted types of symbol character data, namely D4 and D5. Format-converted symbol character data D4 is of the "packed data" format, particularly adapted for efficient storage in the data storage unit 118. Format-converted symbol character data D5 is particularly adapted for data transmission to data collection and storage device, or a host device such as a computer or electronic cash register. When format converted data D5 is to be transmitted to a host device, the system controller 122 will generate and provide enable signal $E_{DT}$ to data transmission circuit 119. Thereupon, data transmission circuit 119 transmits format-converted data D5 to the data collection or host device via the data transmission lines of flexible connector cable 125.

Figure 10A:
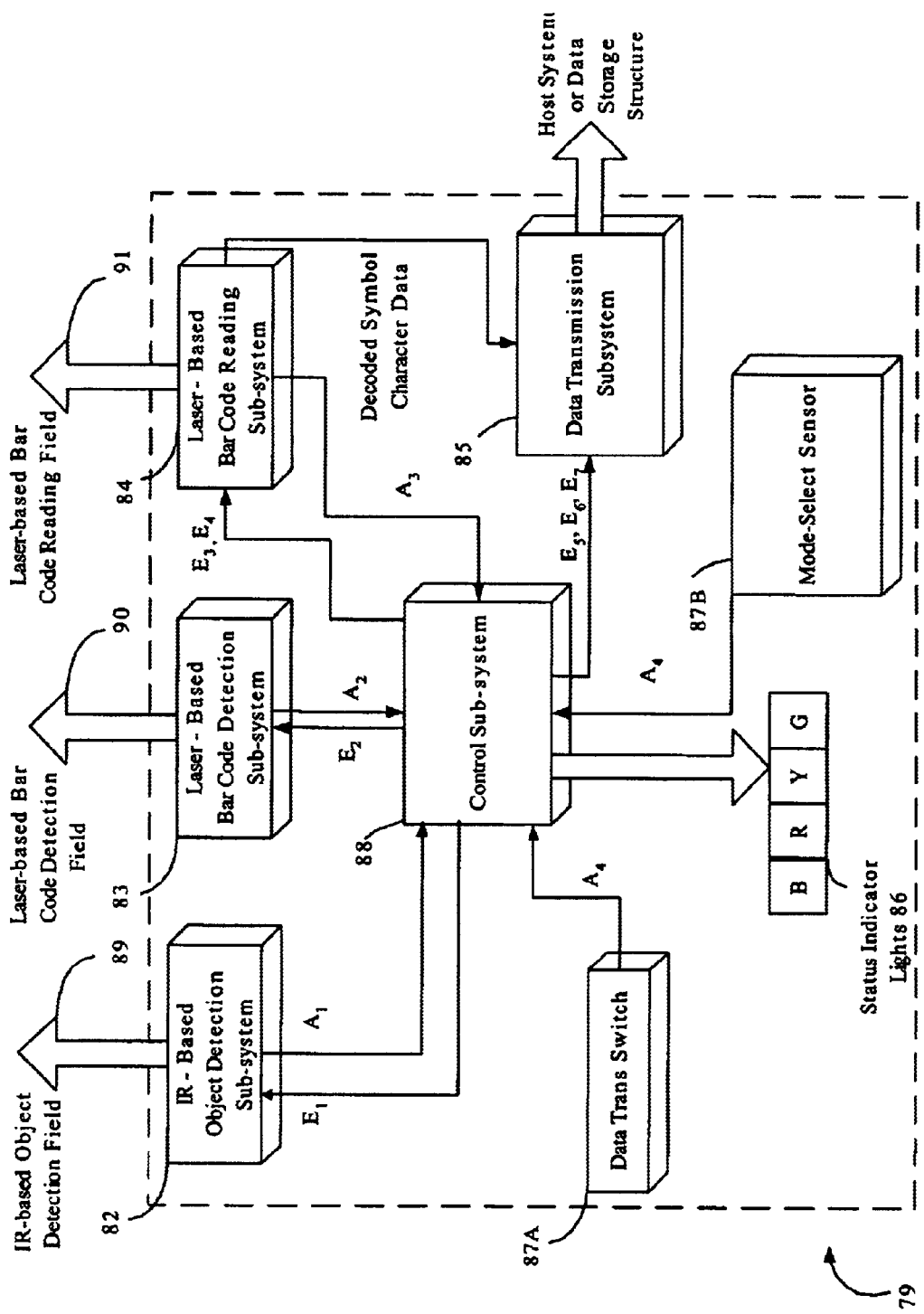
FIG. 10A is a schematic representation of second embodiment of an automatically-activated scanning system of the present invention

As shown in FIG. 10A a second embodiment of an automatically activated bar code symbol scanning system of a second design is composed of a number of subsystems as well, namely an IR-based object detection subsystem 82; a laser-based bar code symbol detection subsystem 83; a laser-based bar code symbol reading subsystem 84; a data transmission subsystem 85; a state indication subsystem 86; a data transmission activation switch or control device 87A integrated with the scanner housing in part or whole; a mode-selection sensor 87B integrated with the scanner housing in part or whole; and a system control subsystem 88 operably connected to the other subsystems described above. In general, system 79 has a number of preprogrammed operational states, namely: an object detection state; a bar code symbol detection state; a bar code symbol reading state; and a data transmission state.

Within the context of the system design shown in FIG. 10A, the IR-based object detection subsystem 82 performs the following primary functions during the object detection state: (i) automatically and synchronously transmitting and receiving pulse infrared (IR) signals within an IR-based object detection field 89 defined relative to the scanner housing 10; (ii) automatically detecting an object in a least a portion of the IR-based object detection field 89 by analysis of the received IR pulse signals; and (iii) in response thereto, automatically generating a first control activation signal A1 indicative of such automatic detection of the object within the object detection field. As shown in FIG. 1A, the first control activation signal A1=1 is provided to the system control subsystem 88 for detection, analysis and programmed response. When control activation signal A1=1 is received by the system controller the bar code symbol reading device is caused to undergo a state transition from bar code symbol detection state to bar code symbol detection state. This transition has been described in detail in connection with the embodiment shown in FIG. 10.

As shown in the figures hereof, object detection, bar code detection and bar code reading fields 89, 90 and 91, respectively, have been schematically represented only in general terms. For purposes of clarity, the specific characteristics of these fields have not been shown. Notably, however, such characteristics can be ascertained from the various references relating thereto which are identified and incorporated herein by reference.

Within the context of the system design shown in FIG. 10A, the laser-based bar code symbol detection subsystem 83 performs the following primary functions during the bar code symbol detection state: (i) automatically generating a visible laser scanning pattern of predetermined characteristics within the laser-based bar code (symbol) detection field 90, defined relative to the scanner housing (not shown), to enable scanning of a bar code symbol on the detected object; (ii) automatically processing scan data collected from the bar code symbol detection field 89 and detecting the presence of the bar code symbol thereon; and (iii) automatically generating a control activation signal A2=1 indicative thereof in response to the automatic detection of the bar code symbol. As shown in FIG. 10A, the second control activation signal A2 is provided to the system control subsystem 88 for detection, analysis and programmed response. When second control activation signal A2 is provided to the system control subsystem 88, this causes the bar code symbol reading device to undergo a state transition from bar code symbol detection state to bar code symbol reading state. This transition has also been described in detail in connection with FIG. 10 above.

Within the context of the system design shown in FIG. 10A, the laser-based bar code symbol reading subsystem 84 performs the following functions during the bar code symbol reading state: (i) automatically generating an omnidirectional visible laser scanning pattern within the laser-based bar code symbol reading field 91 defined relative to the scanner housing, to enable scanning of the detected bar code symbol therein; (ii) automatically decode-processing scan data collected from the bar code symbol reading field 91 so as to detect the bar code symbol on the detected object; (iii) automatically generating a third control activation signal A3=1 indicative of a successful decoding operation, and producing decoded symbol character data representative of the detected and read bar code symbol. As shown in FIG. 10A, the third control activation signal A3 is provided to the system control subsystem 88 for detection, analysis and programmed response. The system control subsystem 88 responds as described above in relation to FIG. 10, whereby the data is decoded and formatted and sent to the data transmission subsystem 85.

Within the context of the system design shown in FIG. 10A, the data transmission subsystem 85 during the data transmission state automatically transmits produced symbol character data to the host system (to which the bar code reading device is connected) or to some other data storage and/or processing device, only when the system control subsystem 88 detects the following conditions: (1) generation of third control activation signal A3=1 within a predetermined time period, indicative that the bar code symbol has been read; and (ii) generation of data transmission control activation control signal A4=1 (e.g. produced from manually-actuatable switch 87A) within a predetermined time frame, indicative that the user desires the produced bar code symbol character data to be transmitted to the host system or intended device.

Within the context of the system design shown in FIG. 10A, the state-selection sensor 87B has two primary functions: (i) to automatically generate the fourth control activation signal A4=1 whenever the scanner housing has been placed on a countertop or like surface, so that the system is automatically induced into its automatic hands-free mode of operation; and (ii) to automatically generate the fourth control activation signal A4=0 whenever the scanner housing has been lifted off of a countertop or like surface, so that the system is automatically induced into its automatic hands-on mode of operation. In the automatic hands-free mode of operation, the state-selection sensor 87B effectively overrides the data transmission switch 87A. In the automatic hands-on mode of operation, the data transmission switch 87A effectively overrides the state-selection sensor 87B.

Within the context of the system design shown in FIG. 10A, the system control subsystem 88 performs the following primary functions: (i) automatically receiving control activation signals A1, A2, A3 and A4; (ii) automatically generating enable signals E1, E2, E3, and E4; and (iii) automatically controlling the operation of the other subsystems in accordance with a system control program carried out by the system control subsystem 88 during the various modes of system operation.

Figure 11:
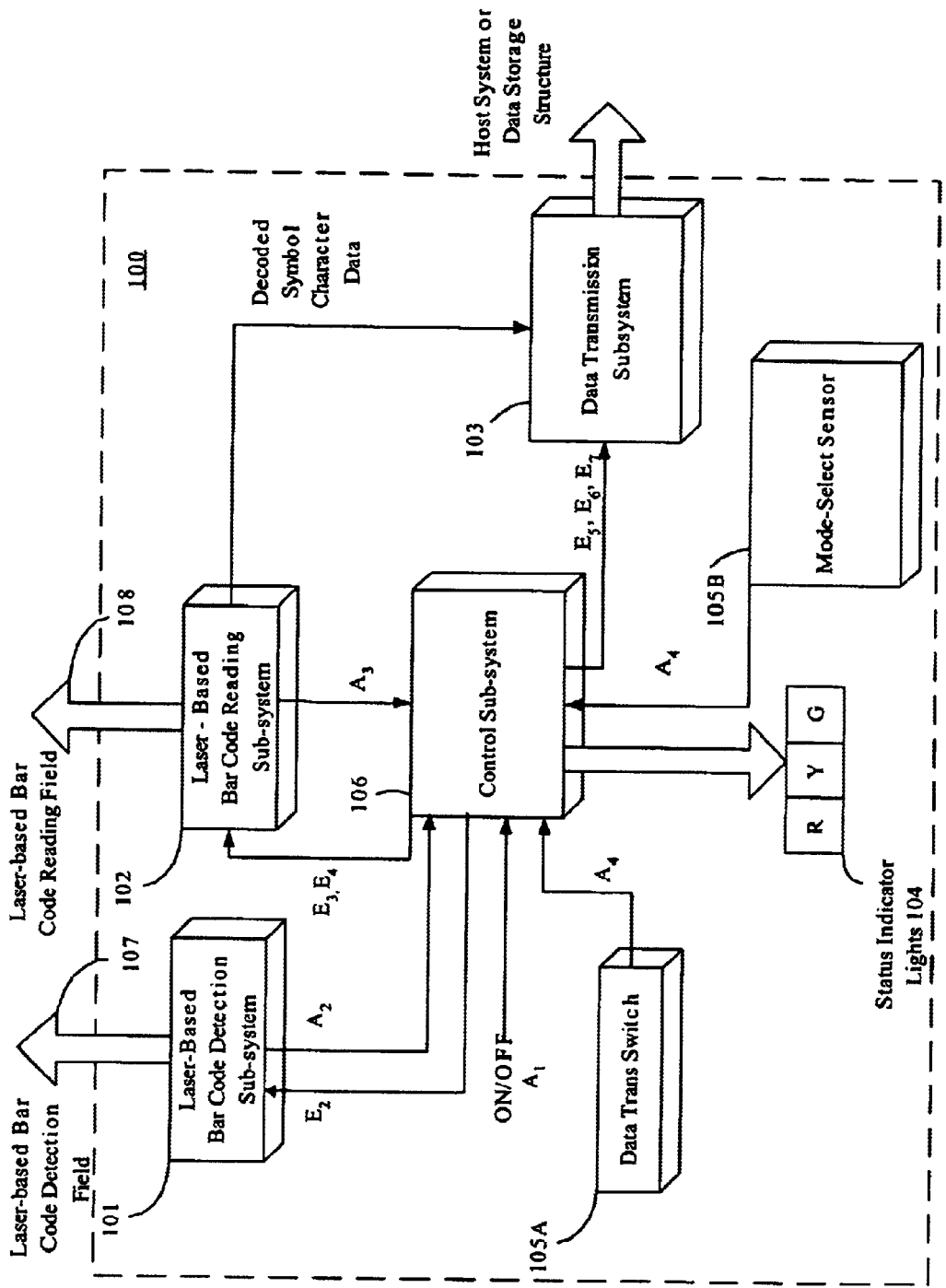
FIG. 11 is a schematic representation of third embodiment of the automatically-activated scanning system of the present invention.
Figure 11A:
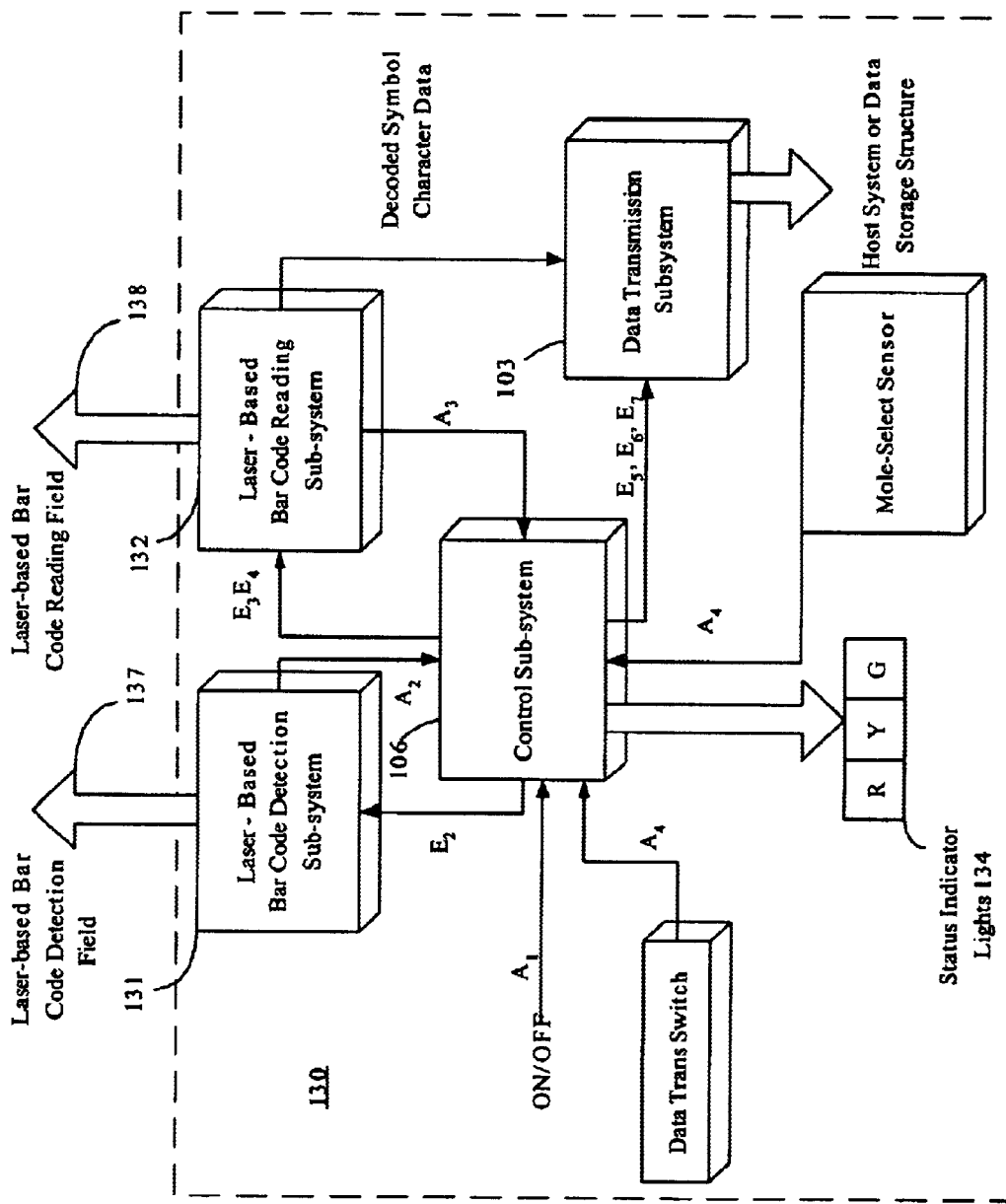
FIG. 11A is a schematic representation of a fourth embodiment of the automatically-activated scanning system of the present invention.

FIGS. 11 and 11A illustrate an automatically-activated laser bar code scanning system wherein there is no object detection subsystem and the system is activated from the bar code presence detection state. The automatically-activated laser bar code scanning system concept is shown in related application Ser. No. 09/204,176 (the '176 application being commonly owned by Metrologic Instruments, Inc. and incorporated herein by reference). As indicated in FIG. 11, the automatically-activated bar code symbol scanning platform of this third general system design 100 comprises a number of subsystems, namely: a laser-based bar code symbol detection subsystem 101; a laser-based bar code symbol reading subsystem 102; a data transmission subsystem 103; a state indication subsystem 104; a data transmission activation switch or control device 105A integrated with the scanner housing (not shown) in part or whole; a mode-selection sensor 105B integrated with the scanner housing in part or whole; and a system control subsystem 106 operably connected to the other subsystems described above. In general, the system 100 has a number of preprogrammed states of operation, namely: an object detection state; a bar code symbol detection state; a bar code symbol reading state; and a data transmission state.

Within the context of the system design shown in FIG. 11, the laser-based bar code symbol detection subsystem 101 performs the following primary functions during the bar code symbol detection state: (i) automatically generates a pulsed visible laser scanning pattern of predetermined characteristics within a laser-based bar code symbol detection field 107, defined relative to the scanner housing, to enable the detection of a bar code symbol on an object located in the field 107; (ii) automatically processes scan data collected from the bar code symbol detection field 107 and detects the presence of the bar code symbol thereon; and (iii) automatically generates a control activation signal A2=1 indicative thereof in response to the automatic detection of the bar code symbol. As shown in FIG. 11, the second control activation signal A2 is provided to the system control subsystem 106 for detection, analysis and programmed response. When second control activation signal A2 is provided to the system control subsystem 88, this causes the bar code symbol reading device to undergo a state transition from bar code symbol detection state to bar code symbol reading state. This transition has been previously described in detail in connection with FIG. 10 above.

Within the context of the system design shown in FIG. 11, the laser-based bar code symbol reading subsystem 102 performs the following functions during the bar code symbol reading state: (i) automatically generates a visible laser scanning pattern of predetermined characteristics within a laser-based bar code (symbol) reading field 108 defined relative to the scanner housing, to enable scanning of the detected bar code symbol therein; (ii) automatically decode-processes scan data collected from the bar code symbol reading field 108 so as to detect the bar code symbol on the detected object; (iii) automatically generates a third control activation signal A3=1 indicative of a successful decoding operation, and produces decoded symbol character data representative of the detected and read bar code symbol. As shown in FIG. 11, the third control activation signal A3 is provided to the system control subsystem 106 for detection, analysis and programmed response. The system control subsystem 106 responds as described above in relation to FIG. 10, whereby the data is decoded and formatted and sent to the data transmission subsystem 103.

Within the context of the system design shown in FIG. 11, the data transmission subsystem 103 during the Data Transmission State automatically transmits produced symbol character data to the host system (to which the bar code reading device is connected) or to some other data storage and/or processing device, only when the system control subsystem 106 detects the following conditions: (1) generation of third control activation signal A3=1 within a predetermined time period, indicative that the bar code symbol has been read; and (ii) generation of data transmission control activation signal A4=1 (e.g. produced from manually-actuatable switch 105A) within a predetermined time frame, indicative that user desires the produced bar code symbol character data to be transmitted to the host system or intended device.

Within the context of the system design shown in FIG. 11, the state-selection sensor 105B has two primary functions: (i) to automatically generate the fourth control activation signal A4=1 whenever the scanner housing has been placed on a countertop or like surface so that the system is automatically induced into an automatic hands-free mode of operation; and (ii) to automatically generate the fourth control activation signal A4=0 whenever the scanner housing has been lifted off of a countertop or like surface so that the system is automatically induced into an automatic hands-on mode of operation. In the automatic hands-free mode of operation, the mode-select sensor 105B effectively overrides the data transmission switch 105A. In the automatic hands-on mode of operation, the data transmission switch 105A effectively overrides the mode-select sensor 105B.

Within the context of the system design shown in FIG. 11, the system control subsystem 106 performs the following primary functions: (i) automatically receiving control activation signals A2, A3 and A4; (ii) automatically generating enable signals E2, E3, and E4; and (iii) automatically controlling the operation of the other subsystems in accordance with a system control program carried out by the system control subsystem 106 during the various modes of system operation.

The fourth general system design of the automatically-activated bar code symbol scanning as shown in FIG. 11A, comprises a number of subsystems, namely: a laser-based bar code symbol detection subsystem 131; a laser-based bar code symbol reading subsystem 132; a data transmission subsystem 133; a state indication subsystem 134; and a system control subsystem 136 operably connected to the other subsystems described above. In general, the system 130 has a number of preprogrammed states of operation, namely: a bar code symbol detection state; a bar code symbol reading state; and a data transmission state.

Within the context of the system design shown in FIG. 11A, the laser-based bar code symbol detection subsystem 131 performs the following primary functions during the bar code symbol detection state: (i) automatically generates a pulsed visible laser scanning pattern of predetermined characteristics within a laser-based bar code symbol detection field 137, defined relative to the scanner housing, to enable the detection of a bar code symbol on an object located in the field 137; (ii) automatically processes scan data collected from the bar code symbol detection field 137 and detects the presence of the bar code symbol thereon; and (iii) automatically generates a control activation signal A2=1 indicative thereof in response to the automatic detection of the bar code symbol. As shown in FIG. 11A, the second control activation signal A2 is provided to the system control subsystem 136 for detection, analysis and programmed response. When second control activation signal A2 is provided to the system control subsystem 136, this causes the bar code symbol reading device to undergo a state transition from bar code symbol detection state to bar code symbol reading state. This transition has been described in detail in connection with FIG. 10 above.

Within the context of the system design shown in FIG. 11A, the laser-based bar code symbol reading subsystem 132 performs the following functions during the bar code symbol reading state: (i) automatically generates a visible laser scanning pattern of predetermined characteristics within a laser-based bar code (symbol) reading field 138 defined relative to the scanner housing, to enable scanning of the detected bar code symbol therein; (ii) automatically decode-processes scan data collected from the bar code symbol reading field 138 so as to detect the bar code symbol on the detected object; (iii) automatically generates a third control activation signal A3=1 indicative of a successful decoding operation, and produces decoded symbol character data representative of the detected and read bar code symbol. As shown in FIG. 11A, the third control activation signal A3 is provided to the system control subsystem 136 for detection, analysis and programmed response. The system control subsystem 136 responds as described above in relation to FIG. 10, whereby the data is decoded and formatted and sent to the data transmission subsystem 133.

Within the context of the system design shown in FIG. 11A, the data transmission subsystem 133 during the data transmission state automatically transmits produced symbol character data to the host system (to which the bar code reading device is connected) or to some other data storage and/or processing device, only when the system control subsystem 136 detects the generation of third control activation signal A3=1 within a predetermined time period, indicative that the bar code symbol has been read.

Within the context of the system design shown in FIG. 11A, the system control subsystem 136 performs the following primary functions: (i) automatically receiving control activation signals A2, A3 and A4; (ii) automatically generating enable signals E2, E3, and E4; and (iii) automatically controlling the operation of the other subsystems in accordance with a system control program carried out by the system control subsystem 106 during the various modes of system operation.

Having now set forth the preferred embodiments and certain modifications of the concepts underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A compact scanner housing, comprising:
    a base unit having an upwardly curved top opening and a pair of opposing guide members mounted within the base unit beneath said curved top opening;
    a scanning head for housing a scan platform and having an aperture for projecting a scanning pattern and receiving reflected light therethrough, said scanning head having an exterior curvature conforming to the curved top opening of said base unit for supporting pivoting thereon about an axis of rotation, and a downwardly protruding neck portion for insertion into said curved opening in said base unit and slidable cooperation with said pair of opposing guide members for further supporting pivoting about said axis of rotation;
    said scanning head being doubly supported for pivoting both by the curved top opening of said base unit and by the opposing guide members in said base unit, respectively defining different radii of rotation about said axis of rotation.

2. The compact scanner housing according to claim 1, wherein said base unit is constructed so that it can perform scanning operations from both a hand-held and free-standing position.

3. The compact scanner housing according to claim 1, wherein said scanning head further includes an LED power indicator.

4. The compact scanner housing according to claim 3, wherein said scanning window of said head unit is mounted in a circular bumper in said aperture and is recessed therein,- wherein said circular housing bumper encircles the periphery of said window for protection thereof.

5. The compact scanner housing according to claim 1, wherein said scanning head is formed in a generally spherical configuration with a front scanning window.

6. The compact scanner housing according to claim 1, wherein said base unit includes a removable bottom plate.

7. The compact scanner housing according to claim 1, wherein said base unit has a flat bottom configured for placement directly on a counter-top surface.

8. The compact scanner housing according to claim 1, wherein said base unit is rearwardly contoured to fit the palm of a hand.

9. The compact scanner housing according to claim 1, wherein said base unit is formed with lateral recesses on opposing sides to provide thumb and finger grips.

10. The compact scanner housing according to claim 1, wherein the bottom of said neck portion of said head unit is defined by opposing arcuate indentations.

11. The compact scanner housing according to claim 1, further comprising a guide plate attached to the distal end of said head unit neck for slidably anchoring the neck to the two opposing shelf-supports.

12. A compact scanner, comprising:
    a scanner housing including a base unit having an upwardly directed opening, and a pair of opposing arcuate guide rails mounted within the base unit beneath said opening, a scanning head for enclosing a scan platform capable of projecting a scanning pattern and receiving reflected light, said head having an exterior curvature conforming to said opening of said base unit for supported pivotal seating thereon about an axis of rotation, and said head also having a downwardly protruding neck extending into said opening and for slidable cooperation with said pair of opposing arcuate guide rails, said scanning head being doubly supported for pivoting both by the top opening of said base unit and by the opposing guide rails in said base unit, respectively defining two different radii of rotation about said axis of rotation to minimize friction against said base unit; and
    a scanning platform mounted in said head including an object detection circuit for detecting and determining the presence of an object within an operative scanning range.

13. The compact scanner according to claim 12, wherein said scanner housing permits an omnidirectional scan from a free-standing fixed position atop a counter or while hand-held by a user.

14. The compact scanner according to claim 12, wherein said scanning head further includes an LED power indicator.

15. The compact scanner housing according to claim 12, wherein said scanning head is formed in a generally spherical configuration with a front scanning window.

16. The compact scanner housing according to claim 15, wherein said scanning window is mounted in a circular bumper which is recessed in an aperture formed in head, whereby said bumper encircles the periphery of said window for protection thereof.

17. The compact scanner housing according to claim 12, wherein said base unit includes a removable bottom plate.

18. The compact scanner housing according to claim 12, wherein said base unit has a flat bottom configured for placement directly on a counter-top surface.

19. The compact scanner housing according to claim 12, wherein said neck is rearwardly contoured to fit the palm of a hand.

20. The compact scanner housing according to claim 12, wherein said base unit is formed with lateral recesses on opposing sides to provide thumb and finger grips.

21. The compact scanner housing according to claim 12, wherein the underside of said neck is defined by opposing arcuate indentations.

22. The compact scanner housing according to claim 12, further comprising a guide plate attached to the distal end of said neck for slidably anchoring said neck to said base unit.

23. A compact omnidirectional scanner, comprising:
    a scanner housing having
      (a) a substantially spherical scanning head having a light transmission aperture and a downwardly protruding neck portion extending therefrom, and
      (b) a base unit having an upwardly curved opening, and a pair of opposing guide members mounted in said base unit and recessed beneath said upwardly curved opening,
      wherein said neck portion of said scanning head is inserted into said base unit and is slidably supported by said guide members, said scanning head thereby being pivotable about an axis of rotation and being doubly supported for pivoting both by the upwardly curved opening of said base unit and by the pair of opposing guide members, respectively defining two different radii of rotation about said axis of rotation;
    an omnidirectional laser scanning engine mounted in said scanning head having;
      (a) an optical bench which extends along a central reference axis,
      (b) a laser beam producing means for producing a laser beam, (c) a laser beam sweeping means having at least first, second and third light reflective surfaces each being disposed a different acute angle with respect to a rotational axis of said laser beam sweeping means for sequentially sweeping said laser beam about said rotational axis along a plurality of different paths, (d) a stationary array of at least first second, third and fourth light reflective surfaces mounted to said optical bench, (e) a laser light collection subsystem, including a light collection element for collecting return laser light and a light receiving means for detecting the intensity said collected return laser light and producing an electrical signal indicative of said detected intensity, (f) signal processing means for processing said electrical signal and producing scan data representative of a scanned code symbol, and (g) control means for controlling the operation of said omnidirectional laser scanning engine.

24. The compact omnidirectional scanner of claim 23, wherein said light collection element has a pair of pivot arms which are snap mounted to a pair of brackets formed in said optical bench.

25. The compact omnidirectional scanner of claim 24, wherein said pivot arms are integrally formed on said light collection element.

26. The compact omnidirectional scanner of claim 24, wherein a beam directing element is mounted to said light collection element for folding said laser beam in said scanner housing.

27. The compact omnidirectional scanner of claim 24, further comprising:

object detection means mounted in said scanner housing for detecting an object located in an object detection field defined external to said scanner housing and for generating a first activation signal for transmission to said control means, whereby said laser beam producing means, said laser beam sweeping means, said light receiving means and said signal processing means are automatically activated upon the detection of said object.

* * * * *